United States Patent [19]
Logston et al.

[11] Patent Number: 5,481,542
[45] Date of Patent: Jan. 2, 1996

[54] INTERACTIVE INFORMATION SERVICES CONTROL SYSTEM

[75] Inventors: Gary L. Logston, Tucker; Anthony J. Wasilewski, Alpharetta; Timothy H. Addington, Roswell; William E. Wall, Jr., Atlanta, all of Ga.

[73] Assignee: Scientific-Atlanta, Inc., Norcross, Ga.

[21] Appl. No.: 149,929

[22] Filed: Nov. 10, 1993

[51] Int. Cl.[6] .................................................. H04N 7/173
[52] U.S. Cl. .................... 370/94.2; 370/95.3; 370/110.1; 348/7; 348/13
[58] Field of Search ................................ 370/94.1, 94.2, 370/94.3, 95.1, 95.3, 110.1; 359/135, 136; 348/6, 7, 12, 13

[56] References Cited

U.S. PATENT DOCUMENTS

| | | | |
|---|---|---|---|
| 4,430,731 | 2/1984 | Gimple et al. | 370/30 |
| 4,509,073 | 4/1985 | Baran et al. | 358/86 |
| 4,573,072 | 2/1986 | Freeman | 358/86 |
| 4,602,279 | 7/1986 | Freeman | 358/86 |
| 4,623,920 | 11/1986 | Dufresne et al. | 358/122 |
| 4,763,317 | 8/1988 | Lehman et al. | 370/58 |
| 4,769,833 | 9/1988 | Farleigh et al. | 379/105 |
| 4,792,849 | 12/1988 | McCalley et al. | 358/86 |
| 5,014,125 | 5/1991 | Pocock et al. | 358/86 |
| 5,165,091 | 11/1992 | Lape et al. | 370/94.1 |
| 5,172,413 | 12/1992 | Bradley et al. | 348/7 |
| 5,181,106 | 1/1993 | Sutherland | 348/7 |
| 5,235,619 | 8/1993 | Beyers, II et al. | 375/38 |
| 5,247,347 | 9/1993 | Litteral et al. | 348/12 |
| 5,303,229 | 4/1994 | Withers et al. | 348/7 |

OTHER PUBLICATIONS

"A Store-and-Forward Architecture for Video-On-Demand Service", Gelman et al. IEEE 1991.
"Video-On-Demand A Traffic Model and GOS Technique", S. Lederman IEEE 1986.
"Video on Demand Internal Trial", Chris Sell, Fiber Networks for Voice, Video, and Multimedia Services 1992.

*Primary Examiner*—Douglas W. Olms
*Assistant Examiner*—Min Jung
*Attorney, Agent, or Firm*—Woodcock Washburn Kurtz Mackiewicz & Norris

[57] ABSTRACT

A digital video, audio and data distribution system which enables a set-top terminal (STT) associated with a customer's television set or other information presentation device to request interactive digital video, audio and data services from a service provider (SP) through the use of control system messages transmitted via a bi-directional signalling path. The requested interactive service is transmitted from the service provider over a portion of the bandwidth of a broadband transmission network which is dedicated to interactive digital services. A Video Session Connection (VSC) is provided for setting up and maintaining interactive sessions between the set-top terminal and a video service provider during the time the interactive programming is provided to the customer. The set-top terminal and service provider establish the Video Session Connection via a two-way signalling path within the bandwidth of the transmission medium into the customer's home. Applications of the system of the invention include "movie on demand" services where the set-top terminal not only requests a movie to be transmitted from the service provider for immediate transmission, but also the bi-directional command channel permits the set-top terminal to control the video presentation by sending commands such as Play, Pause, Fast-Forward and the like to the Service Provider while the movie is being transmitted. Other applications of the invention include on-line data retrieval services, shop at home services and other services which require the use of an interactive connection.

64 Claims, 12 Drawing Sheets

INTERACTIVE INFORMATION SERVICES CONTROL SYSTEM

BACKGROUND OF THE INVENTION

1. Field of the Invention

The present invention relates to a control system for providing interactive information services, such as video, audio, library, interactive games, and the like. Particular video applications include "movie on demand", on-line data retrieval, and shop at home. The information services in accordance with the invention all require the use of an interactive connection between a services provider or another user and the customer's set top terminal over a network. More particularly, the invention relates to a control system for establishing an information session connection between the customer's set top terminal and the service provider or other user over a network and then managing the bi-directional network communications necessary to provide the interactive information services to the customer.

2. Description of the Prior Art

Recent advances in digital signal processing techniques and, in particular, advancements in digital compression techniques, have led to a plethora of proposals for providing new digital services to the customer's home via existing telephone and coaxial cable lines. For example, it has been proposed to provide hundreds of CATV channels to customers by compressing digital video, transmitting the compressed digital video over conventional coaxial CATV cables, and then decompressing the video at the customer's set top terminal. Another proposed application of this technology is a "movie on demand" video system in which a customer communicates directly with a video service provider via the telephone lines to request a particular video program from a video library and the requested video program is routed to the caller's home via the telephone lines or via the coaxial CATV cables for immediate viewing.

For example, an interactive television system of this type has been described by Pocock et al. in U.S. Pat. No. 5,014,125 which employs a two-way telephone connection to send command signals from a viewer to a central controller for selecting various video programs and for sending the audio portion of such video programs from a central location to the viewer. Once the connection is established, a transmission path connecting the viewer to the central location is identified and its ID is sent from the viewer's set top terminal to the central controller. This transmission path is then used to control the transmission of the video programming to the viewer's terminal, where the programming is stored and retransmitted to the viewer's television. Once the transmission of the video program has started, address and command data may be sent from the video service provider to the viewer's set top terminal in the vertical blanking interval of the video frames. Unfortunately, however, the system described by Pocock et al. requires the use of the telephone lines to transmit commands from the set top terminal to the central controller and thus requires use of the telephone standards and protocols under control of the telephone companies for the transmission of the commands. Moreover, the Pocock et al. system is interactive only in the sense that the viewer may request a particular video program. The viewer may not interact with the video program during transmission using commands such as Play, Pause, Fast Forward, and the like as when the program is locally controlled via the viewer's video cassette recorder (VCR).

In U.S. Pat. No. 5,235,619 to Beyers, II et al., assigned to the same assignee as the present application, an RF return method is described in which data is transmitted over a plurality of selectable data channels having carrier frequencies which are located within a television bandwidth channel reserved for upstream transmission from a CATV subscriber to a headend control location. As described therein, the upstream transmit levels are automatically set on a periodic basis and transmit times are selected in which at least one time is random. These return path channels are used for video conferencing, power meter reading, alarm services, subscriber polling and voting, collecting subscriber viewing statistics, home shopping, and impulse pay-per-view services. However, to date, such RF return paths have been used for billing data and the like which are sent on a periodic basis and have not been adapted to provide a completely interactive information session connection between a CATV subscriber and the information provider (or another CATV subscriber) whereby commands and data flow back and forth in real-time.

Many believe that a truly interactive system in which a customer can selectively access a large audio, video or data library and control the presentation of the selected information on a real-time basis, as when the video program is played back using the viewer's VCR, or in which one customer may interact with another customer, as in the case of interactive video games, long distance learning, and the like, will revolutionize the way people acquire information and receive entertainment. Unfortunately, prior to the present invention, a communication system and protocol have not been established which will permit the implementation of a "movie on demand" system or other such "interactive" information service which will accept commands from the viewer throughout the presentation of the program on a real-time basis. On the contrary, prior art systems such as that described by Beyers, II et al. have been limited to customer polling systems, billing systems and the like which do not interactively affect the presentation of the selected service.

To date, the telephone companies have promoted the use of their ISDN digital switching network for routing digital information to the customers. Unfortunately, the telephone lines enter the home as a twisted pair which does not have the bandwidth desired for the transmission of digital video, for example. On the other hand, the cable television companies have promoted the use of the existing broadband coaxial cables for providing digital video data and other information to the viewer. Unfortunately, the CATV systems lack the switching mechanisms needed to route unique programming to each viewer. Indeed, the biggest obstacle to implementation of an interactive information system appears to be the lack of cooperation between the cable television and telephone industries and an agreement regarding common transmission standards and protocols which will be approved by the Federal Communications Commission (FCC). Applicant also knows of no concrete proposals by either camp for implementing a truly interactive digital network which permits the customer to continuously communicate with an information service provider throughout the transmission of the requested programming.

Thus, while there is tremendous market potential for an interactive information services system, no one has taken the lead to provide an interactive information services system which meets the needs and requirements of the customers using conventional communications protocols which are acceptable to the FCC as well as those in the art. It is thus desired to develop an interactive information services system which combines the best characteristics of the cable and telephone transmission systems and to incorporate such characteristics into an independent interactive information services system which will bring the digital revolution into the home. It is also desired that such a system couple the convenience of the home video cassette recorder with the infinite programming flexibility that access to a large library over a network will provide. The present invention has been designed to meet these needs.

SUMMARY OF THE INVENTION

The above-mentioned needs in the art have been met in accordance with the invention by providing an interactive information services system which operates independently of the telephone networks and protocols and instead operates in accordance with signalling requirements more like those for standard network busses. The interactive information services system of the invention is preferably implemented as a stand alone system which is installed as a new service; however, the interactive information services network of the invention may also be connected to conventional broadband cable television systems which have been modified to include, for example, fiber optic cable for the additional bandwidth necessary to transmit the interactive information services of the invention.

The interactive information services (IIS) system of the invention establishes and maintains an information session connection between the customer's set top terminal (STT) and the service provider (SP) which allows control messages in a predetermined format to be exchanged between the FCC mandated service boundaries between audio and video services. This aspect of the invention is referred to herein as providing an information session connection or "Video Session Connection" (VSC) in the context of a video service. The IIS system of the invention enables a customer's STT to request a service from an SP through the use of control system messages and then enables the SP to transmit the requested services over a portion of the bandwidth of a broadband transmission network which is connected to the STT. The invention also maintains this communications connection throughout the transmission of the requested interactive information service so that navigational commands, such as fast-forward, rewind, pause, forward scan, reverse scan, and other hyper media navigation commands, may be transmitted to the SP from the STT without the use of the telephone connection to the customer's home.

In accordance with the invention, the SP provides the interactive information service to a digital network through a transport mechanism using UNISON-1 definitions. The interactive information service is then routed to the appropriate broadband channel and transmitted to the requesting customer's STT. As described herein, UNISON-1 is a UNI-directional, Synchronous Optical Network interface which is modeled after the standard SONET transport mechanism except that the standard has been modified to facilitate the transmission of unidirectional, asynchronous packetized data, such as MPEG-2 Systems transport packets and Asynchronous Transfer Mode (ATM) cells carrying data which is compressed and combined in accordance with current MPEG-2 protocols. At the headend, the MPEG-2 data is converted into 64-QAM data in 6 MHz channels for transmission to the requesting customer. At the customer's STT, the information service data is decompressed and decrypted and mapped to the appropriate channel of the customer's television for display.

In accordance with the invention, an information session connection is established between the STT and the SP which allows them to communicate through a reverse signalling path. This path allows the STT to request a service and then control the selected service interactively on a real-time basis. The reverse signalling path is preferably provided within the band of the transmission media entering the customer's home. Preferably, the reverse signalling path is shared by several STTs, and each STT preferably accesses the bi-directional communication path using time division multiple access (TDMA) and slotted ALOHA techniques for preventing data collision. The data in the bi-directional communication path is then QPSK demodulated and sent via Ethernet directly, or via a connection management computer (CMC) at the headend or other central information point, to the SP. Similarly, the SP sends signals over the bi-directional path by sending its data via Ethernet to the headend or other central information point where it is QPSK modulated and sent to the STT having the appropriate address.

One application for the type of service described herein is in the area of "movie on demand" services where the STT requests a movie to be transmitted from an SP. Then, while the movie is being transmitted, the STT has the ability in accordance with the invention to send commands such as play, pause, fast-forward, forward scan, reverse scan, and the like to the SP over the existing bi-directional connection. Other applications include on-line data retrieval services, shop at home services, interactive video games (where the SP is replaced by another member of the network), long distance learning, museum on cable, and other services which would be improved through the use of an interactive connection.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

A preferred embodiment of the invention will now be described with reference to FIGS. 1–14. It will be appreciated by those of ordinary skill in the art that the description given herein with respect to those figures is for exemplary purposes only and is not intended in any way to limit the scope of the invention. For example, the bandwidths and frequencies used are merely those which are presently preferred and are not intended to limit the invention. All questions regarding the scope of the invention may be resolved by referring to the appended claims.

A. System Overview

Figure 1:
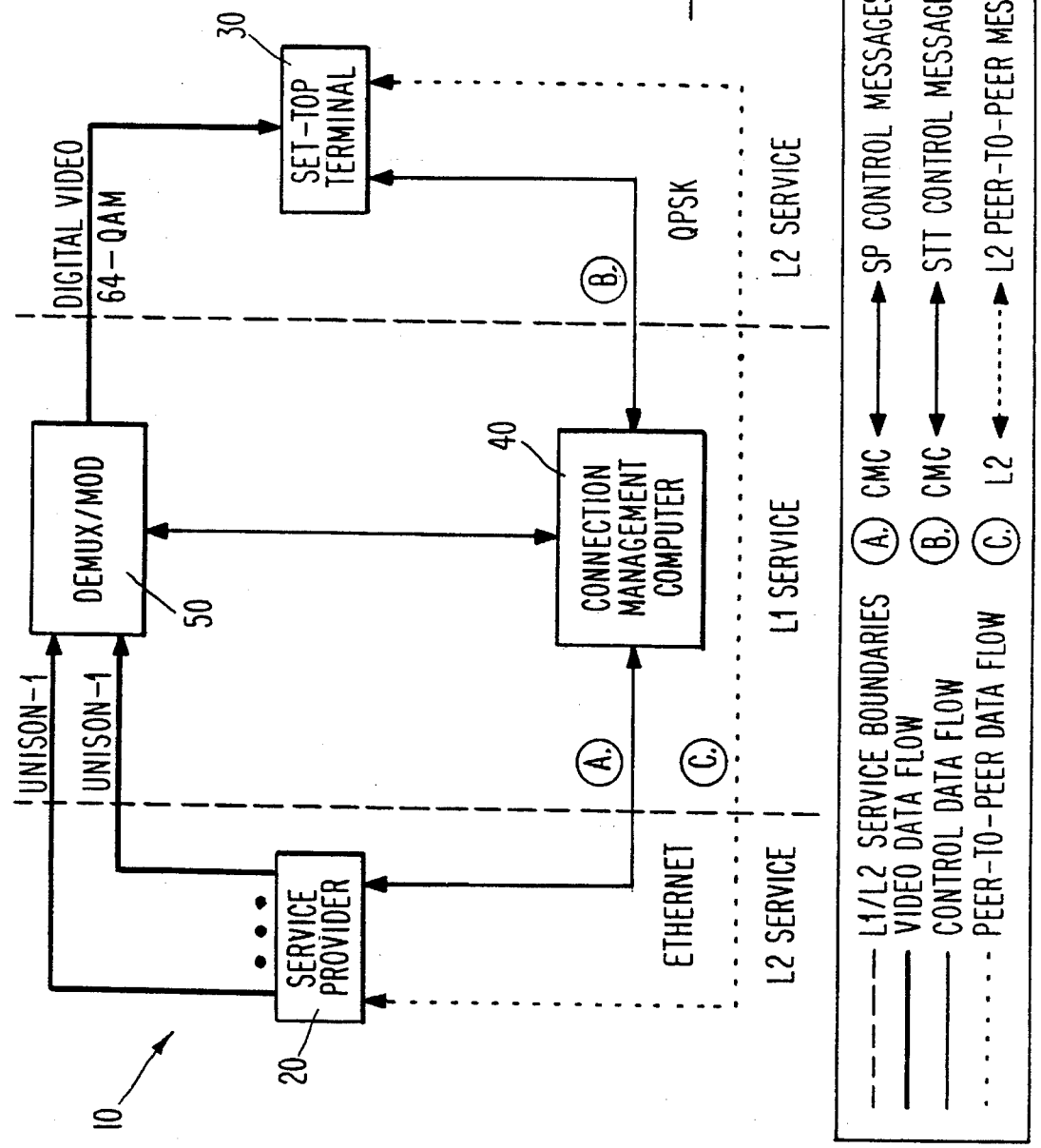
FIG. 1 is a generalized block diagram of an interactive digital information services network which establishes and maintains bi-directional communication between a set top terminal and a service provider as well as a unidirectional path for the flow of digital information data to the set top terminal in accordance with the techniques of the invention.

FIG. 1 is a block diagram of the components of a digital information distribution system 10 in accordance with the invention. As will be described in more detail below with respect to FIG. 2, the digital information distribution system 10 provides a mechanism whereby data such as compressed digital video data from a service provider (SP) 20 is transmitted over a broadband transmission network to a customer's set top terminal (STT) 30 for presentation to the customer. In the case of a video service, for example, the received information is displayed on the customer's television. In accordance with the invention, a bi-directional communication path is also established and maintained between the SP 20 and the STT 30 by a connection management computer (CMC) 40. This portion of the system of the invention is referred to as an information session connection which allows the communication of the requested information service data between the SP 20 and the STT 30. As also shown in FIG. 1, a demultiplexer/modulator 50 is provided for converting the compressed broadband digital information service data into a plurality of 6 MHz television channels under control of CMC 40 for provision to the customer's television via the customer's STT 30.

As shown in FIG. 1, the digital information distribution system 10 of the invention is divided into Level 1 service (L1) and Level 2 service (L2). Level 1 service provides the information session connection or "Video Session Connection" (VSC) in the preferred embodiment and is the portion of the system responsible for setting up and maintaining an interactive communication session between the STT 30 and the SP 20. Level 1 service is regulated by the Federal Communications Commission (FCC). Level 2 service, on the other hand, is the portion of the system responsible for providing the requested service to the L1 portion of the network from the SP 20 and for terminating the service at the user end of the network (the STT 30). Level 2 service is defined by the FCC as an enhanced services provider and is not regulated by the FCC. Thus, the present invention utilizes a combination of Level 1 and Level 2 services and requires a plurality of interfaces between the Level 1 and Level 2 services.

In particular, the present invention utilizes four common interfaces for providing television transmission information service channels for conveying digitized representations of 525-line NTSC color or monochrome video signals, associated audio signals, associated synchronization signals, and associated signalling applications between the SP 20 and the STT 30. As illustrated in FIG. 1, the interface between the SP 20 (L2) and the demultiplexer/modulator 50 at the headend (L1) is preferably a UNISON-1 interface, which is a 155.520 Mbps optical signal interface which can be used to transfer Motion Picture Experts Group (MPEG-2) Systems transport packets containing compressed digital video and audio data as well as other digital service information from the SP 20 to the demultiplexer/modulator 50. The interface between the demultiplexer/modulator 50 at the headend (L1) and the STT 30 (L2) is preferably a 64 Quadrature Amplitude Modulation (64-QAM) interface which utilizes Scientific Atlanta's multi-rate transport mechanism (MRT) for transporting the MPEG-2 Systems transport packets to the STT 30. A third interface between the customer's STT 30 (L2) and CMC 40 at the headend (L1) is preferably a forward and reverse path signalling interface which utilizes differentially encoded Offset Quaternary Phase-Shift Keying (0-QPSK) modulation. Finally, the interface between CMC 40 (L1) and the SP 20 (L2) is preferably a forward and reverse path signalling interface which utilizes Ethernet (IEEE 802.3). These interfaces will be described in detail below.

Connection management computer (CMC) 40 manages sessions between the STT 30 and the SP 20. The CMC 40 is responsible for provisioning the demultiplexer/modulator 50, provisioning the STT 30, provisioning the QPSK demodulators 120 and 122 (FIG. 2), provisioning the QPSK modulator 124 (FIG. 2), providing routing information to the digital network 128 (FIG. 2), when appropriate, and for information session management between the STT 30 and the SP 20. As will be described more fully below, either the STT 30 or the SP 20 may send a request for an information service to the CMC 40. The CMC 40 determines if there are resources available for transporting the requested services and, if so, establishes a service connection from the SP 20 to the STT 30. The CMC 40 then sends the service information to both the STT 30 and the SP 20 to allow them to connect to the network and begin the requested interactive information service. The message flows between service levels L1 and L2 also will be described more fully below.

B. Digital Information Distribution System 10

A preferred embodiment of digital information distribution system 10 in accordance with the invention will now be described with respect to FIG. 2. The respective interfaces will then be described in detail. Finally, sample system command messages and sample sessions will be described to better illustrate operation of the system of the invention.

Figure 2:
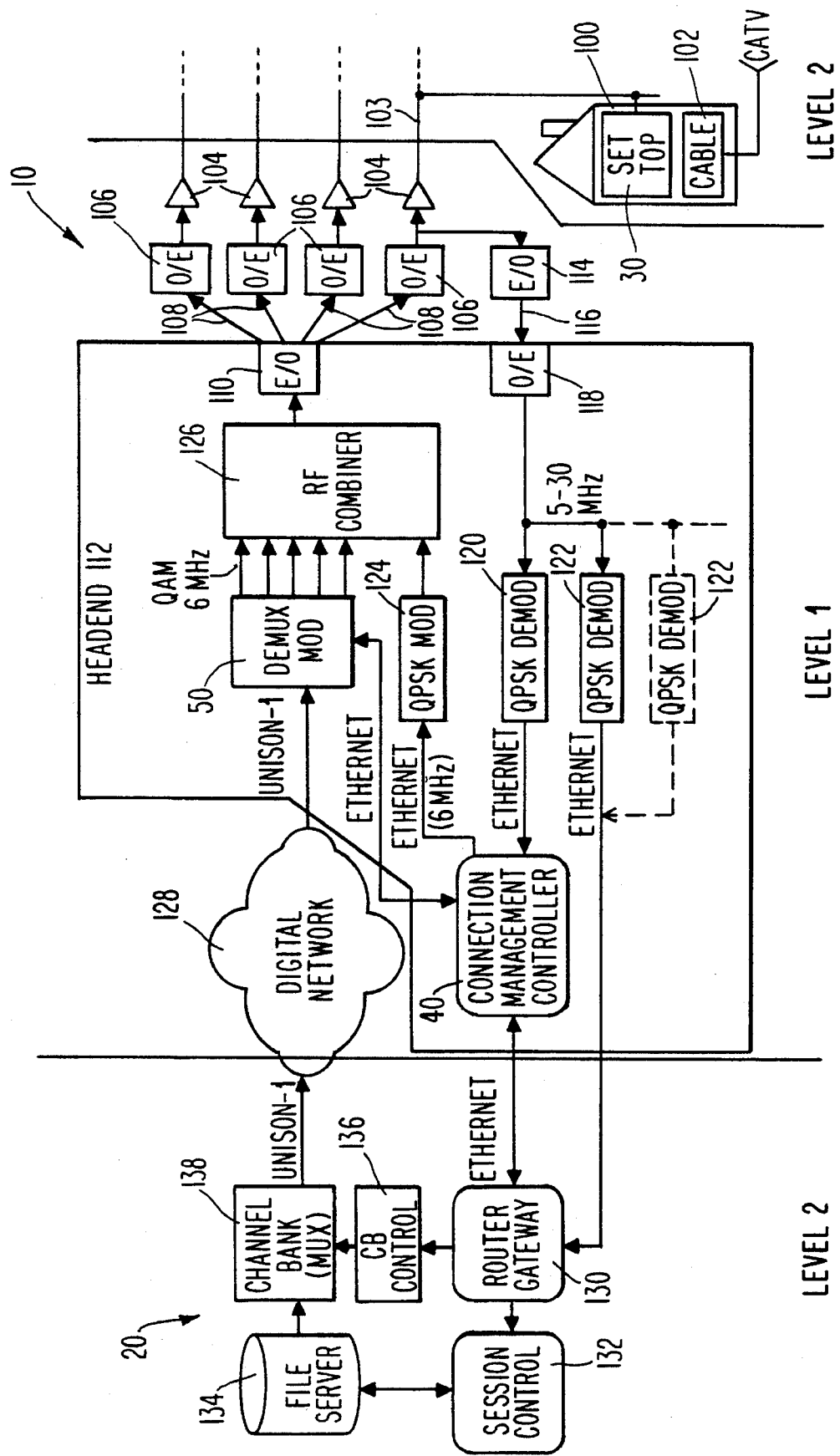
FIG. 2 is a generalized block diagram of a digital information distribution system for providing interactive digital information services to a customer in accordance with the techniques of the invention.

FIG. 2 illustrates the digital information distribution system 10 of the invention whereby a service provider (SP) 20 may provide the requested information services to a customer's home 100. As illustrated, set top terminal (STT) 30 is provided within the customer's home 100 for communication with the SP 20 via the digital information distribution system 10 of the invention. STT 30 preferably has data processing capabilities and local storage for controlling the presentation of the received data to the customer's television or other information presentation device.

As shown, digital information distribution system 10 of the invention may be completely separate from the conventional CATV system which provides CATV signals over conventional coaxial or optical lines to a cable box 102 associated with the customer's television. For example, in one implementation of the invention, conventional CATV systems are modified to incorporate the interactive information services system 10 of the invention in addition to the traditional cable television offerings by providing transmission media with greater bandwidths and by upgrading the communication hardware. On the other hand, the system of the invention may be completely independent of existing cable television systems and provided in competition with existing CATV systems. In the latter case, STT 30 and the rest of the digital information distribution system 10 will be provided to the customer in addition to the conventional CATV offerings provided via the cable box 102.

As shown in FIG. 2, several STTs 30 are connected across a common bi-directional communication link 103 to one of a plurality of broadband amplifiers 104. Preferably, each communication link 103 can handle 500 or more STTs 30. In other words, each communication link 103 may connect at least 500 local customers to the digital information distribution system 10 of the invention. Thus, the system illustrated by way of example in FIG. 2 could support at least 2000 customers and may be readily expanded by adding additional hardware.

Amplifiers 104 also receive analog service information signals provided by optical to electrical (O/E) converters 106 which, in turn, receive optical signals from an optical loop network 108. Optical loop network 108 receives optical signals from an electrical to optical (E/O) converter 110 provided at headend 112. Optical loop network 108 thus functions to provide service information signals from the headend 112 to the proximity of the customer's STT 30. At present, a coaxial cable 103 carries the service information signals the final distance into the customer's home 100; however, it soon may be cost-effective to utilize optical fibers for this purpose. Of course, optical loop network 108 between the headend 112 and the STT 30 is not strictly required. A coaxial system with sufficient broadband transmission characteristics may also be used in accordance with the invention. However, optical loop network 108 is presently preferred.

Once the address of the STT 30 is known by the CMC 40 (see section D) and the STT 30 has established an information session connection to the SP 20, as will be described in more detail below with respect to FIG. 4, the STT 30 communicates with the SP 20 over a TDMA upstream application signalling link. Depending on the system load, there may be more than one TDMA data stream. The CMC 40 keeps track of these TDMA data streams and instructs the STT 30 where in the broadband spectrum it should tune for its TDMA channel or channels and assigns the STT 30 an allocation of time slots in that data stream in accordance with the techniques to be described below with respect to FIG. 4.

The aforementioned bi-directional communication link 103 is part of a bi-directional communication path between the SP 20 and STT 30 utilized to provide a "Video Session Connection" (VSC) in accordance with a preferred embodiment of the invention in which SP 20 is a video service provider. Of course, SP 20 may provide other types of digital services such as audio, text, interactive video games, and the like. As shown, the upstream application signalling link from STT 30 to SP 20 includes an electrical to optical (E/O) converter 114 for converting the signal from STT 30 into an optical signal for transmission over an optical fiber 116 (which may be an optical fiber in optical loop network 108) to an optical to electrical (O/E) converter 118 at the headend 112. In a preferred embodiment, the reverse signalling path occupies 1.544 MHz in the spectrum between 5 MHz and 30 MHz. This signal is provided either to QPSK demodulator 120 for communication via Ethernet to CMC 40 or via one or more QPSK demodulators 122 for pass-through communication via Ethernet to SP 20. As will be appreciated by those skilled in the art, additional QPSK demodulators 122 may be used in the reverse signalling path to increase the bandwidth of the communications channel between the STT 30 and the SP 20. For example, if a 30 MHz bandwidth reverse signalling path is desired, 19 or 20 QPSK demodulators 122 having bandwidths of approximately 1.544 MHz each may be provided.

As also shown in FIG. 2, the forward signalling path between the SP 20 and the STT 30 is provided via CMC 40 on Ethernet to QPSK modulator 124 via one or more of the available channels of the broadband transmission system. For example, the frequency range for the forward path electrical signal may be between 108 MHz and 114 MHz. The forward path electrical signal output by QPSK modulator 124 is provided to RF combiner 126 along with the 64 QAM video signals modulated into 6 MHz channels by demultiplexer/modulator 50. The resulting signals are then converted into optical signals by E/O 110 as described above and transmitted via the optical loop network 108 to the STTs 30.

Headend 112 communicates with the SP 20 via a digital network 128. This digital network 128 routes the requested data from the SP 20 to the headend 112 which controls the provision of digital information services to the requesting STT 30. As will be described in more detail below with respect to FIGS. 6–8, the digital data provided via the digital network 128 is formatted in accordance with UNISON-1 definitions and provides 155.520 Mbps of video, audio and data in MPEG-2 Systems transport packets to the headend 112.

Finally, SP 20 includes a router gateway 130 which interprets messages received from CMC 40 and/or STT 30 via Ethernet and controls the access of data in a video program or other data library (not shown). Session control block 132 keeps track of billing information and the like for the programs requested by the customer. If session control 132 establishes that the customer's credit is good, the customer is allowed access to the compressed program data library via file server 134. Of course, several such file servers 134 may be provided for accessing one or more program data libraries of one or more SPs 20. Channel bank control block 136 responds to router gateway block 130 to add program IDs and the like to MPEG-2 Systems transport packets containing the digital information provided by the file server 134 to the channel bank/multiplexer 138. Channel bank/multiplexer 138 combines the MPEG-2 Systems transport packets from one or more program data libraries using the MPEG-2 Systems transport packets format and then further formats this data into UNISON-1 STS-3c frames for transmission over digital network 128 to the headend 112 of the requesting STT 30. Channel bank/multiplexer 138 also time adjusts the MPEG-2 Systems transport packets, time stamps the packets and adjusts for delays in the transmission on the digital network 128 as necessary. Preferably, channel bank/multiplexer 138 also provides an encryption mechanism so that the data may be securely transmitted and then decrypted at the customer's STT 30 in accordance with known techniques.

In a preferred embodiment, the digital information distribution system 10 illustrated in FIG. 2 is connected to the customer's home 100 via a coaxial cable having a coaxial capacity of at least 650 MHz. As noted above, implementation of such a system may require upgrading of conventional CATV hardware including the coaxial cables for provision of the disclosed interactive service by the local cable television companies, or, on the other hand, the system of the invention may be provided as a separate system from that provided by the local cable television companies.

Figure 3:
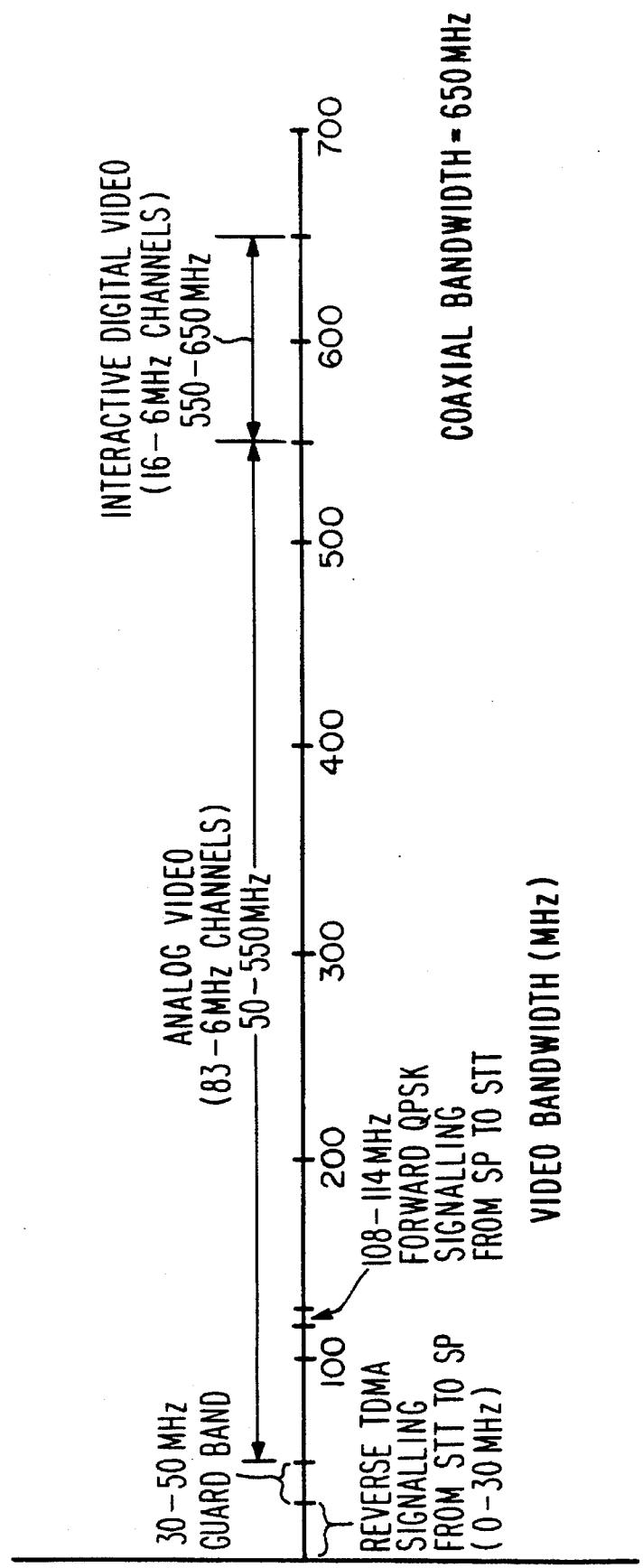
FIG. 3 illustrates a preferred allocation of the frequency spectrum available on a 650 MHz coaxial cable connecting a customer's set top terminal to the digital information distribution system of the invention.

As illustrated in FIG. 3, a 650 MHz coaxial cable can be allocated to accommodate conventional analog video services, as well as interactive digital information services, including forward and reverse signalling paths for providing information session connections (ISCs) in accordance with the invention. In the illustrated configuration, up to 30 MHz of the bandwidth is allocated for the TDMA reverse path signalling from the STT 30 to the SP 20 using the TDMA and/or slotted ALOHA and QPSK demodulation (1.544 MHz signalling channels) techniques described herein. However, the bandwidth from 5 MHz to 30 MHz is preferably used to avoid baseband CTB and CSO noise. A guard band is then allocated from approximately 30 MHz to 50 MHz in order to minimize cross-talk between second and third order components of the reverse path (0–30 MHz) and the forward path (50–650 MHz). In the illustrated embodiment, the 50 MHz to 550 MHz band is allocated for the conventional analog video provided from SP 20 to the STT 30. The conventional cable ready channels are transmitted in this band, although the conventional cable ready channels may be sent over one transmission medium and the interactive information provided over a separate transmission medium. In another configuration, MPEG-2 data compression techniques can be utilized to transmit 650 digital programs (836 MHz channels with 8 programs per channel) in this band. These digital programs can be either broadcast services or interactive programs in accordance with the invention. As noted above, the forward path signalling from the headend 112 to the STT 30 can be provided in one of the available channels in the 50 MHz to 550 MHz band (e.g., 108–114 MHz). Finally, the 550 MHz to 650 MHz band is used in the latter configuration for the interactive digital information transmission in accordance with the invention. Thus, approximately sixteen 6 MHz channels are allocated for interactive digital information program delivery. When 8 video programs are compressed and transmitted per 6 MHz channel using MPEG-2 Systems transport packets, approximately 128 separate interactive digital programs per 100 MHz of bandwidth may be transmitted in accordance with the invention.

Of course, different frequency allocations may be used in accordance with the techniques disclosed herein; however, it is important that the reverse signalling path be separated from the forward paths by a guard band in order to prevent cross-talk. Also, since the number of channels used in accordance with the invention is dependent upon the bandwidth of the transmission medium into the customer's home, it is desired that the connection to the customer's home be sufficient to accommodate the bandwidths used in the digital information distribution system 10 of the invention.

Each of the interfaces between the L1 and L2 services will now be described.

C. Communications Interfaces

1. STT to SP Reverse Path Signalling Interfaces

As noted above, a bi-directional signalling path is provided between SP 20 and STT 30 in accordance with the invention. This section describes the interface between the STT 30 (L2) and the headend 112 (L1). As noted above, the forward and reverse path signalling between the headend 112 and SP 20 utilizes a known Ethernet protocol (IEEE 802.3) and thus will not be described in detail herein.

Those skilled in the art will appreciate that the communications techniques described for the signalling path interfaces are common to a passband architecture which, unlike a baseband architecture, takes advantage of modulated RF carriers to combine several types of modulation schemes, contention techniques, and transport protocols over one shared medium. For this purpose, forward and reverse path signalling are used. In a traditional passband architecture, the RF spectrum is split into two separate and distinct directional communication pathways. The reverse path is the spectrum reserved for communication from customers on the shared network to a centralized control area such as headend 112, while the forward path is the spectrum reserved for communication from the headend 112 to the multiple customers over the network. In accordance with the invention, the two communication pathways are preferably separated by a guard band where no communication is carried out in order to eliminate interference.

Additional methodologies are required to operate the signalling network of the invention. For example, the reverse path signalling includes slotted ALOHA and time division multiple access (TDMA) techniques for preventing contention among the STTs 30 connected to the same reverse path. Message cells are used and differentially encoded Offset Quaternary Phase Shift Keying (O-QPSK) techniques are also used which utilize 1.544 Mbps framing in the forward path and reverse path communication.

a. Slotted ALOHA Signalling

Slotted ALOHA signalling is used in accordance with the invention for managing contention between different STTs 30 for access to the signalling link 103. In particular, slotted ALOHA is used for signalling between the customer's STT 30 and the headend 112 by providing instant channel allocation for the STT 30 when initial access to the signalling link is requested. The slotted ALOHA technique is used for multiple customers that will have equal access to the signalling channel. Since it is probable that simultaneous transmissions will occur, the slotted ALOHA technique provides resolution of signalling throughput when simultaneous transmissions occur.

The signalling channel or channels for the STT 30 and the headend 112 utilizes an analog carrier for transmission. As will be described in more detail below, the modulation technique is preferably Offset-QPSK. Two signalling channels are described herein for providing such function, but those skilled in the art will appreciate that additional channels can be added to accommodate high traffic rates that will result in frequent message packet collisions. The STT 30 will randomly select one of the allotted signalling channels for each packet transmission in order to avoid such collisions.

In accordance with the invention, a time slotting technique is used which allows the transmit start times of each STT 30 to be synchronized to a common clock source. Synchronizing the start times increases message throughput of the signalling channel since the message packets do not overlap during transmission. The period between sequential start times are identified as time slots as illustrated in FIG. 4. Each time slot is a point in time when a message packet can be transmitted over the signalling link via E/O converter 114 and optical link 116 to the headend 112. STTs 30 may only start transmission of packets at time slot boundaries.

The common clock source is preferably a 1.544 Mbps signal generated at the headend 112 and transmitted simultaneously to all STTs 30 connected to that headend 112. Since all STTs 30 reference the same clock source, the slot times are aligned for all STTs 30. However, since there is a propagation delay in any transmission network, the time slot sizes must be sufficient to accommodate any deviation in transmission times between the respective STTs 30 due to the propagation delay. For this purpose, guard bands are provided to fill out time slots having a duration in time of approximately 0.5 msec. Utilizing a 0.5 msec time slot size at 1.544 Mbps provides a rate of 2000 time slots per second for transmission of commands from the STTs 30 to the SP 20.

The message packet structure provided from the STTs 30 in accordance with the invention are preferably 512 bits long and include a preamble of 88 bits and a message cell of 424 bits. The preamble is the header information needed to identify the start of the message cell. The preamble is a fixed pattern for providing a framing sequence to the STTs 30 and is inserted at the first bit of that STT's time slot interval. The message cell is the payload of the actual message which is being provided to the CMC 40 or the SP 20. A preferred format of a message cell is described below with respect to FIG. 5.

Preferably, an additional guard time of, for example, 168.4 microseconds is allocated to each time slot interval to accommodate the propagation delay of the broadband network. The propagation delay accounts for the time in which an STT 30 receives its 1.544 Mbps clocking signal as well as the return transmission time of the message packet to the interactive information services system 10 of the invention.

After transmission of a message packet by an STT 30, the sending STT 30 will determine that the signal was successfully received by the CMC 40 or the SP 20 by having an "echo" message sent back to the sending STT 30. Preferably, the echo message includes the message cell only and does not include the preamble. If the echo is not detected by the sending STT 30 within 200 message time slots or approximately 100 msec., then signal collision is assumed. In other words, it is assumed that two or more STTs 30 have attempted message packet transmission during the same time slot. If a collision occurs, then the STT 30 will retransmit its message packet.

There are two parameters that influence the retransmission and determine its probability for success. These are the retransmit time (in which a new time slot is selected for retransmission), and the use of an additional signal channel. In order to facilitate retransmission, the STT 30 will randomly select a time slot for retransmission at a time period beyond the 100 msec detection time for the echo signal. The time period for retransmission is typically 0–50 msec. Within this period, up to 100 time slots are available for retransmission, and the STT 30 randomly selects a time slot so that the probability of signal collision is minimized. On the other hand, an alternate signalling frequency or channel(s) could be used to increase the probability for successful retransmission of a message packet. Before retransmitting a message packet in accordance with this scheme, the STT 30 selects a signalling frequency (channel) for retransmission. This selection is similarly a random selection so that the probability of success is also increased.

b. TDMA Signalling

After a STT 30 has established a session with the SP 20 using the aforementioned slotted ALOHA signalling technique, the STT 30 communicates with the SP 20 over a TDMA upstream application signalling or "pass-through" link including one or more QPSK demodulators 122 as noted above. Messages sent over the pass-through link may be encapsulated in known protocols such as the Internet Protocol (IP). Depending on the system load, there may be more than one TDMA data stream. The CMC 40 instructs the STT 30 where in the broadband spectrum to tune for its TDMA channel and assigns the STT 30 an allocation of time slots in that data stream. FIG. 4 illustrates an example of how a plurality of STTs 30 connected to the same upstream communication link communicate upstream to the SP 20 using TDMA time slot allocations.

Figure 4:
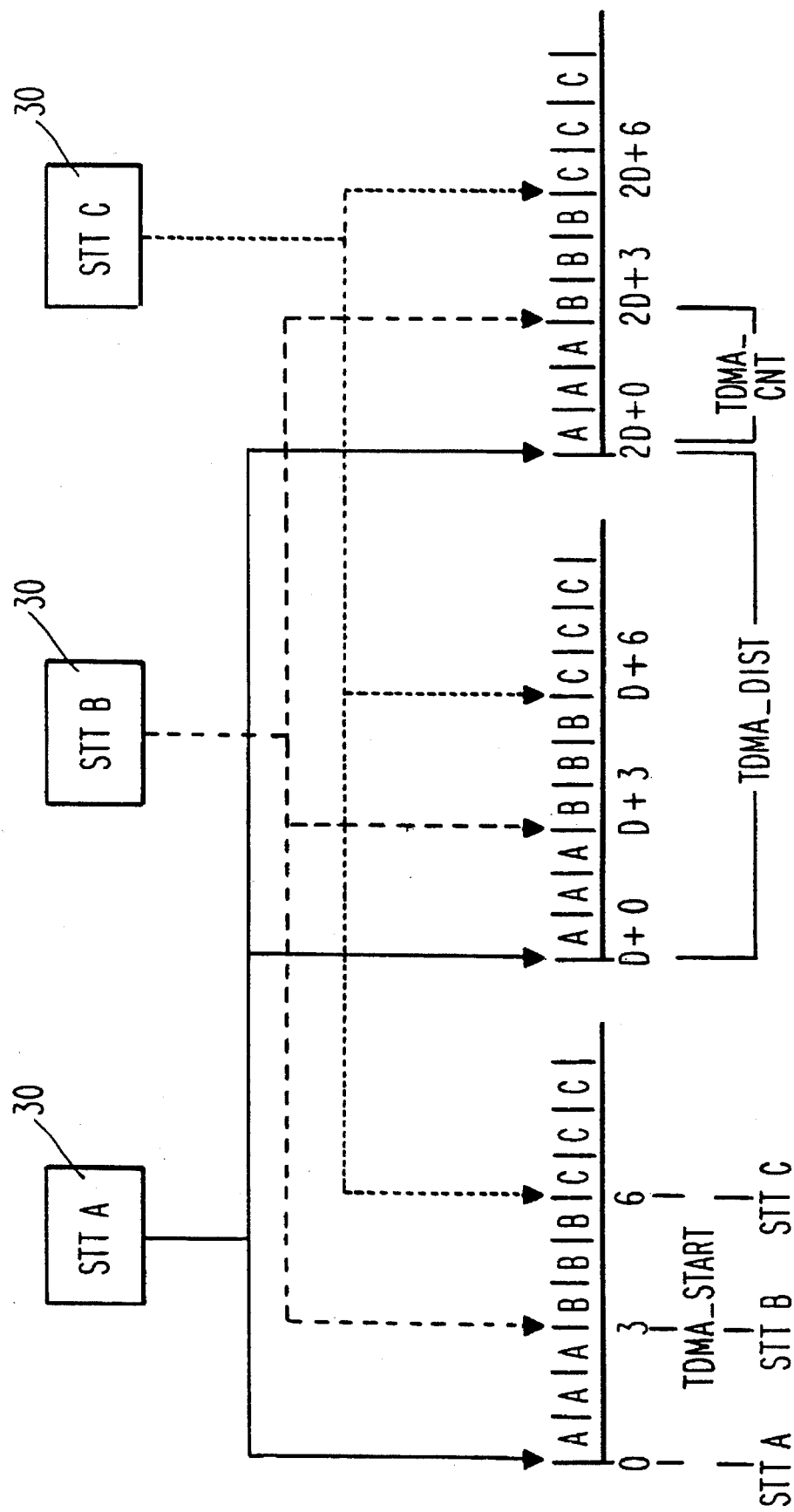
FIG. 4 illustrates an example of how the customer's set top terminal communicates upstream to the service provider using TDMA slot allocations in accordance with the techniques of the invention.

As shown in FIG. 4, each STT 30 has been assigned a TDMA allocation with a length (TDMA$_{13}$ LEN) of 3 and an interval in time slots between groups of TDMA time slots (TDMA$_{13}$ DIST) of 12. As shown, STT A has been assigned a TDMA$_{13}$ START value of 0; STT B has been assigned a TDMA$_{13}$ START value of 3; and STT C has been assigned a TDMA$_{13}$ START value of 6. In the example of FIG. 4, STT A transmits in time intervals 0–2, D through D+2, 2D through 2D+2, 3D through 3D+2, and the like. Similarly, STT B transmits in time intervals 3–5, D+ through D+5, 2D+ through 2D+5, 3D+ through 3D+5, and the like, while STT C transmits in time intervals 6–8, D+6 through D+8, 2D+6 through 2D+8, 3D+6 through 3D+8, and the like. In an actual embodiment, D would be large enough to accommodate up to several hundred STTs 30; however, it is preferred that D be varied in accordance with the system load in order to maintain system flexibility. For example, in the case where a customer is the only one of 500 customers communicating over a particular reverse signalling path, that customer may be allocated every 100 time slots (i.e., D=100) for faster response. On the other hand, if the load on the reverse signalling path is great, more than one TDMA data stream to the headend 112 may be provided.

During operation, all STTs 30 obtain slot timing information from the headend 112 as will be described below. This timing information includes a reference frame count that is used by each STT 30 to determine the value of the current time slot and a synchronization mechanism which defines the boundaries of the time slots on the TDMA channels. As noted above, the transmit start times of each STT 30 are synchronized to a common clock source which is preferably a 1.544 Mbps signal generated at the headend 112 and transmitted simultaneously to all STTs 30 connected to that headend 112. Since all STTs 30 reference the same clock source, the slot times are aligned for all STTs 30.

The timing information that is needed by each STT 30 is preferably transmitted via a common signalling interface signal generated at the headend 112 and transmitted simultaneously to all STTs 30 connected to that headend 112. Preferably, both the common clock source and the common signalling interface signal can be recovered by the STT 30 by means of the Forward Path Signalling Interface, which will be described below. This forward path signalling link contains a bit stream which is framed in an Extended Superframe (ESF) format. A reference frame count is embedded in the M bits (also known as the Data. Link bits) of each Extended Superframe received by the STT 30 from the headend 112 via the Forward Path Signalling Interface. This frame count value will repeatedly count from a value of zero to a value of 999. This frame count value is used by the STT 30 to calculate the time slot number of the time slot which is aligned with the first M bit ($M_1$) of the next Extended Superframe received on the forward path signalling link, by multiplying the extracted frame count value by six (6). This calculation yields time slot numbers which range in value from zero to 5999, and encompass a three second period.

The ESF M bits, which are embedded in the forward path signalling link data stream, are also used by the STT 30 to define the start times of each time slot. The reception of each odd numbered M bit ($M_1$, $M_3$, $M_5$, $M_7$, $M_9$, $M_{11}$) signifies the start of a time slot. When the time slot number equals a STT's $TDMA_{13}$ START count, that STT 30 may transmit message cells into $TDMA_{13}$ CNT's worth of time slots on the assigned TDMA channel. If the STT 30 has more data than will fit into the TDMA_CNT time slot width, the STT 30 must wait TDMA_DIST worth of time slots before it is able to resume transmission on the assigned TDMA channel.

As will be described below, an STT Session Provision command from the CMC 40 provides the STT 30 with the TDMA_CHNL, $TDMA_{13}$ START, $TDMA_{13}$ CNT and $TDMA_{13}$ DIST parameters. The TDMA_CHNL, while not shown in FIG. 4, is used by the STT 30 to determine where in the broadband spectrum to tune for the TDMA channel.

If the network of the STTs 30 changes significantly, the CMC 40 may reassign the TDMA_CHNL, TDMA_START, TDMA_CNT and $TDMA_{13}$ DIST parameters to balance the load. When this occurs, the CMC 40 first reprovisions all of the STTs 30 in the network with new TDMA parameters. However, these parameters do not take effect until the CMC 40 broadcasts a command to the entire population of STTs 30 instructing them to use the new parameters.

TDMA thus allows STTs 30 noncontentious access onto a signalling channel to the SP 20. As will be appreciated by those skilled in the art, TDMA is based on dividing access by multiple STTs 30 onto a shared signalling channel by providing a negotiated bandwidth allocation time slot access method. The aforementioned time slot assignments to the individual STTs 30 are accomplished through messaging from the CMC 40 to the STT 30. Commands for this purpose will be described in more detail below. The TDMA signalling channel preferably serves a node size of several hundred customers. However, since this channel is only used for interactive session messaging, the number of users utilizing this link is limited to the number of functioning simultaneous interactive users.

As shown in FIG. 2, a QPSK demodulator 120 in the network reads the resulting TDMA data stream and reassembles the information contained in the message cells in the TDMA time slots into the original Internet Protocol (IP) packets for transmission from the CMC 40 to the SP 20 in accordance with techniques to be described in more detail below.

c. QPSK Modulation

As noted above, QPSK modulation is used in accordance with the invention as a means of encoding digital information over wire line or optical fiber transmission links for transmission to/from STT 30 and SP 20. In accordance with a preferred embodiment of the invention, Offset Quaternary Phase Shift Keying (O-QPSK) is used due to its increased error performance, its spectral efficiency and its ability to be transmitted at higher than average power levels.

Specifically, QPSK is a four-level use of digital phase modulation. Quadrature signal representations involve expressing an arbitrary phase sinusoidal waveform as a linear combination of a cosine wave and a sine wave with zero starting phases. QPSK generates the phase shift keying (PSK) signals as a linear combination of quadrature signals. For implementation, a device is needed that produces carrier phase shifts in direct proportion to the levels in a baseband signal. The baseband signals are directly modulated to produce the QPSK. Two multi-level baseband signals need to be established: one for the in-phase (I) signal and one for the out-of-phase (Q) signal. The levels chosen for the two baseband signals correspond to the coefficients needed to represent a PSK signal as a linear combination of the I and Q signals. The QPSK modulator divides the incoming bit stream so that bits are sent alternately to the in-phase modulator (I) and the out-of-phase modulator (Q). These same bit streams appear at the output of the respective phase detectors in the modulator where they are interleaved back into a serial bit stream.

QPSK systems require the use of differential encoding and corresponding differential detection. This is a result of the receivers having no method of determining if a recovered reference is a sine reference or a cosine reference. In addition, the polarity of the recovered reference is uncertain. Differential encoding transmits the information in encoded phase differences between the two successive signals. The modulator processes the digital binary symbols to achieve differential encoding and then transmits the absolute phases. The differential encoding is implemented at the digital level.

Offset keying is used in the QPSK system in accordance with the invention in order to minimize envelope variation. This reduces signal degradation caused by a non-linear channel or by a non-linear process in the demodulator. Such techniques are believed to be well known by those skilled in the art.

d. Message Cells

Figure 5A:
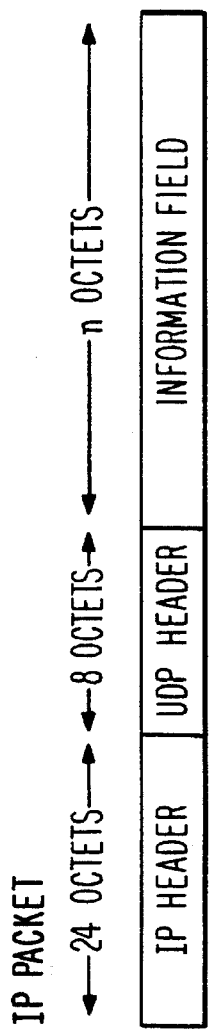
FIG. 5 illustrates the method used to map Internet Protocol (IP) packets into Message Cells for transmission over the forward and reverse path signalling interface of the invention.
Figure 5B:
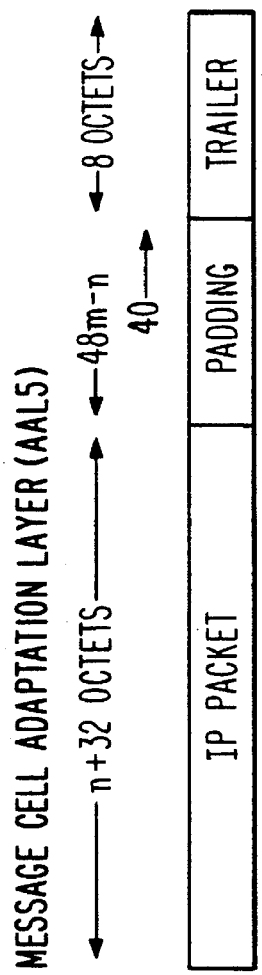
Figure 5C:
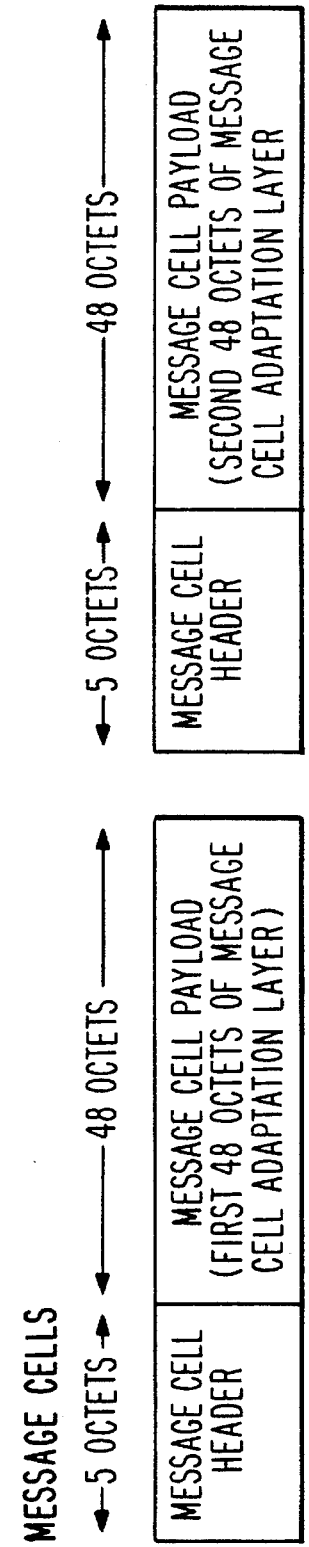

As noted above, a message cell format is used in the signalling from the STT 30 to the headend 112. This message cell format is illustrated in FIG. 5 and is used in both the slotted ALOHA and the TDMA techniques described above. Preferably, each message cell has a 40 bit message cell header and a 384 bit message payload area (FIG. 5(c)). The message cell header preferably includes a path address, a channel address and a header error control (HEC) octet. The HEC preferably covers the entire cell header. The HEC value is an 8-bit sequence which contains the remainder of the division (modulo 2) of the header by the generator polynomial $x^3+x^2+x+1$ multiplied by the content of the header excluding the HEC field. The 8-bit remainder is then exclusive ORed with a predetermined bit pattern before being inserted in the HEC field of the header.

The message cell payload contains all or part of the message cell payload data unit (PDU). A message cell PDU includes a PDU payload (IP Packet), a PAD field used to align the PDU to a message cell boundary, and a trailer which may include a control field, a length field which contains the number of octets in the PDU payload, and a CRC-32 field which is a 32-bit sequence based on a standard generator polynomial of degree 32. Each message cell PDU is contained within one or more sequential message cells which have the same path and channel address. In other words, the path address and channel address must be identical in the message cells of FIG. 5(c) in order to segment a particular PDU across two message cells. The message cell PDU is preferably composed of a single Internet Protocol (IP) packet, as shown in FIGS. 5(a) and 5(b). Each STT 30 is provisioned with a unique path and channel address which is necessary for reassembly. The IP Packets will be described in more detail below under the section heading "CMC Message Formats".

2. SP to STT Forward Path Signalling Interfaces

Forward path signalling from the CMC 40 to a QPSK modulator 124 and then on to a particular STT 30 requires two signalling links: an Ethernet signalling link carrying IP packets in the Ethernet payload area, and a QPSK signalling link, which contains a bit stream which is framed in the Extended Superframe (ESF) format. The payload area of the ESF frame contains a stream of 53 octet message cells within the Physical Layer Convergence Protocol (PLCP) as specified for DS1 in Bellcore Document TR-TSV-000773, Issue 1, June 1991. The QPSK signalling link ESF frame structure partitions the bitstream into 4632 bit Extended Superframes. Each Extended Superframe consists of 24,193-bit frames, where each frame consists of one overhead bit and 24 octets (192 bits) of payload. Twenty-four frame overhead bits are provided in the ESF which are divided into Extended Superframe frame alignment signals, cyclic redundancy check, and data link bits. The ESF frame alignment signal is used to locate all 24 frames and overhead bit positions. The cyclic redundancy check field, on the other hand, contains the CRC-6 check bits calculated over the previous Extended Superframe message block of 4632 bits. The check bit sequence is preferably the remainder after multiplication by $x^6$ and then division by the generator polynomial $x^6+x+1$ of the CRC message block. Finally, the data link bits, or M bits, represent a reference frame count value which defines time slot information for the STT 30 to the QPSK lines. The frame count value is contained in the first 10 M bits ($M_{10}$–$M_1$ with $M_1$ the least significant bit), with $M_{11}$ containing an odd parity bit calculated over the first 10 M bits, and $M_{12}$ set to one. This frame count value will repeatedly count from a value of zero to a value of 999.

3. SP to Headend Network interface

In a typical digital information distribution system 10 in accordance with the invention, the information transported from the service provider (SP) 20 to the headend 112 is generally a combination of video, audio, private data and network control data. The interface between SP 20 and the headend 112 for transporting digital data in accordance with the invention preferably utilizes a UNI-directional, Synchronous Optical Network (UNISON-1) interface which has physical layer characteristics as well as an underlying network transport structure modeled after the known Synchronous Optical Network (SONET) transport. However, several modifications to the SONET standard have been made in accordance with the invention which will be described below. Preferably, the service information in the form of digital data is carried in the payload of an MPEG-2 Systems transport packet of compressed digital data.

While it is desired to digitize the information so that audio, video and other data may be treated in an integrated manner, SP 20 will have wide latitude in the method of digitizing the data and the rate of transport selected to carry its mixed traffic in accordance with its specific requirements. However, in accordance with the invention, the digitization method must be compatible for carriage in MPEG-2 Systems transport packets.

In accordance with the invention, the UNI-directional Synchronous Optical Network (UNISON-1) provides a point to point optical network that utilizes a modification of SONET which does not require complete conformance to the SONET specifications. The UNISON-1 format as described herein is desired since it is capable of transporting a variety of information types in an integrated manner. The physical interface for the UNISON-1 optical signal preferably meets the specifications described for the OC-3 optical interface, intermediate reach, as defined in Bellcore document TR-NWT-000253, Issue 2, December 1991, Section 4, Table 4.11, Column IR-1, while the physical/optical connector is preferably an FC/PC mechanical connector. On the other hand, the UNISON-1 interface signal is preferably synchronized from a Stratum 3 timing source derived from a Regional Bell Operating Company.

Preferably, the basic data rate utilized in the digital network 128 in accordance with the invention is the Synchronous Transport Signal Level 3 concatenation (STS-3c) rate of 155.52 Mbps. Concatenation refers to the transport condition of a SONET system where the entire Synchronous Payload Envelope (SPE) is treated as a single entity or contiguous data stream. In a preferred embodiment, the MPEG-2 Systems transport packets are mapped into the SPE and are then passed to the digital network as a single entity. As known to those skilled in the art, the optical counterpart of the STS-3c is the Optical Carrier Level 3 signal (OC-3), which is the result of a direct optical conversion of the STS-3c after frame synchronous scrambling.

Figures 6, 7:
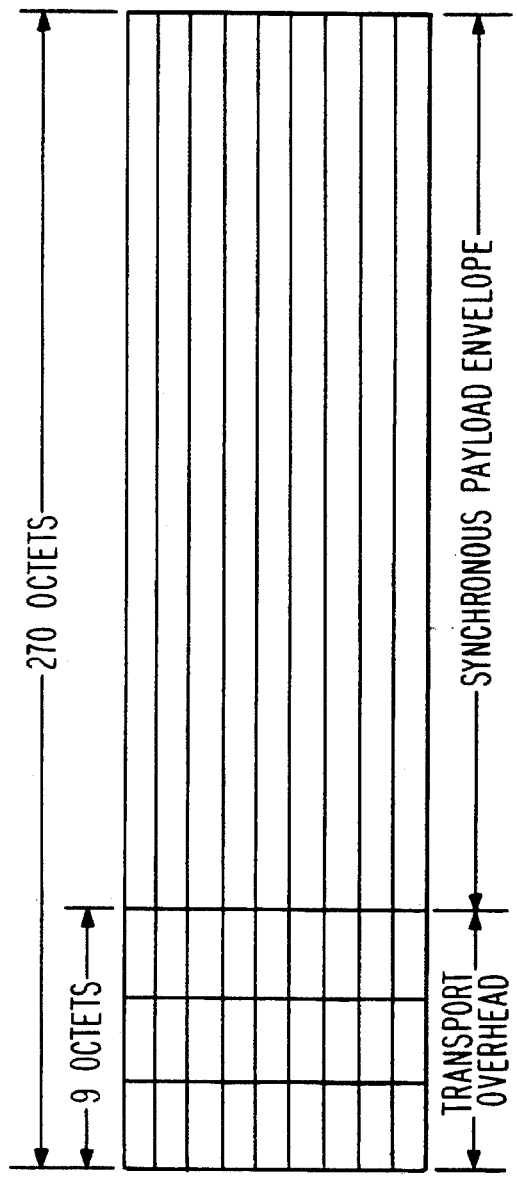
FIG. 6 illustrates the structure of a UNISON-1 Synchronous Transport Signal-level 3 concatenation (STS-3c) frame structure for unidirectional transmission of information services data in accordance with the invention.
FIG. 7 illustrates the transport overhead structure utilized in the UNISON-1 STS-3c frame structure of FIG. 6.

As shown in FIG. 6, a preferred embodiment of the STS-3c frame for UNISON-1 in accordance with the invention consists of 270 columns and 9 rows of 8-bit octets, for a total of 2430 octets. With a frame length of 125 microseconds (8000 frames per second), the STS-3c has a bit rate of 155.52 Mbps. In a preferred embodiment, the first three columns in each row are the Transport Overhead containing overhead octets of Section and Line layers. As shown in FIG. 7, 81 octets are thus allocated, with 27 octets allocated for Section Overhead and 54 octets allocated for Line Overhead. The Section Overhead for STS-3c preferably consists of the following fields: STS-3c framing (A1 and A2), multiplex identification (C1), bit-interleaved parity (BIP-8) (B1) for Section error monitoring functions, and three octets allocated to form one 192 kbps message based channel (D1, D2 and D3). E1 and F1 are currently unused. The Line Overhead for the STS-3c, on the other hand, preferably consists of a pointer field (H1 and H2) which provides offset in the octets between the pointer and the first octet of the STS SPE and indicates when concatenation has occurred, a bit-interleaved parity field (B2) for line error monitoring functions, and nine octets allocated to form one 576 kbps message channel (D4 through D12). H3, K1, K2, Z1, Z2, and E2 are currently unused.

Figure 8:
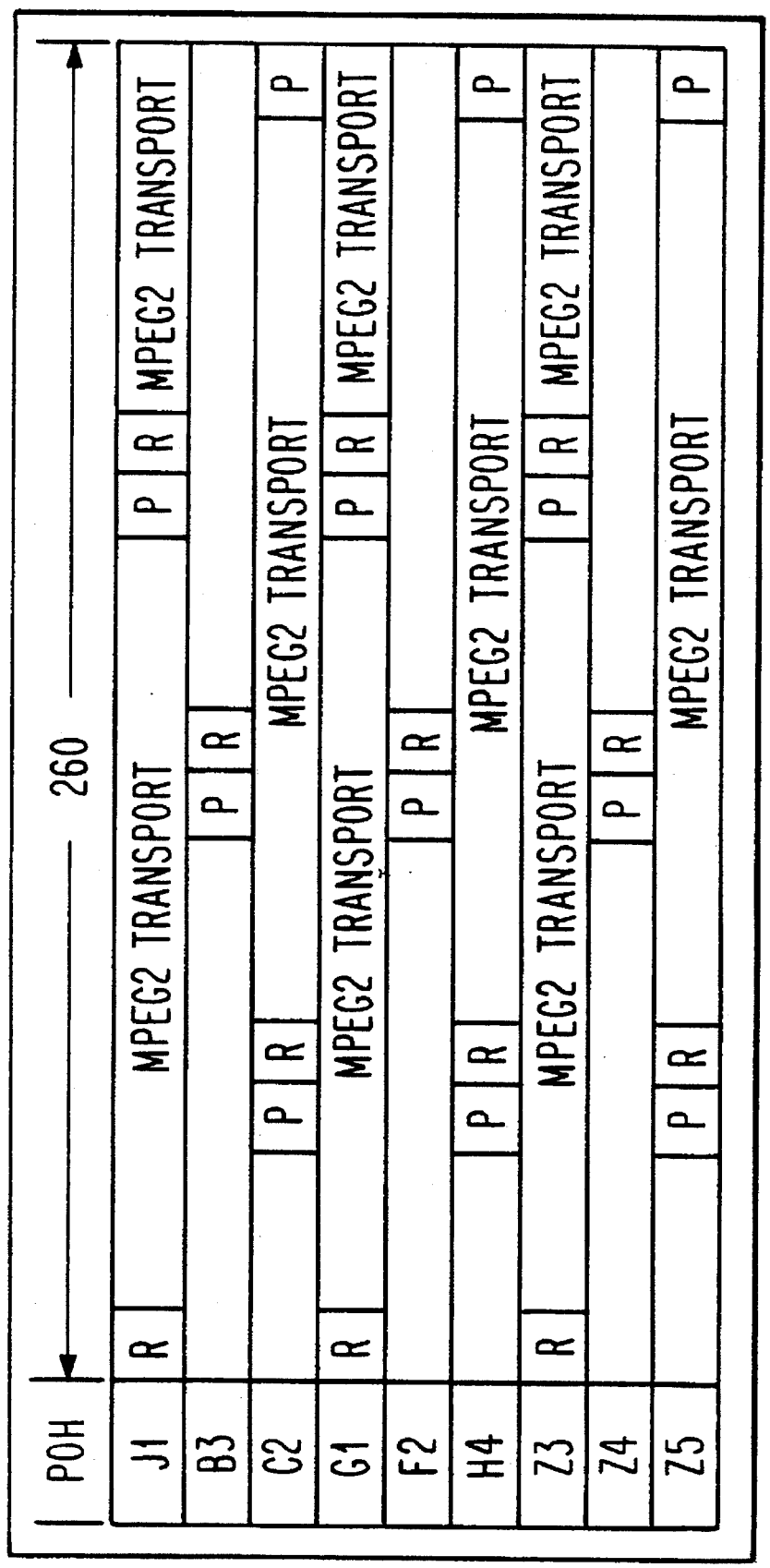
FIG. 8 illustrates the Synchronous Payload Envelope (SPE) structure used for transmitting MPEG-2 Systems transport packets from the service provider to the headend in accordance with the UNISON-1 STS-3c frame structure of FIG. 6.

The payload is contained in the SPE as illustrated in FIG. 8, which is a 125 msec frame structure. The illustrated UNISON-1 STS-3c SPE consists of 261 columns and 9 rows of bytes, for a total 2349 bytes. As shown in FIG. 8, column 1 preferably contains 9 bytes designated as STS Path Overhead (POH), while the remaining 2340 bytes are available for payload. The UNISON-1 STS-3c SPE begins in row 1, column 10 the STS-3c frame. In a preferred embodiment, MPEG-2 Systems transport packets are mapped into the UNISON-1 STS-3c SPE as illustrated in FIG. 8. As shown in FIG. 8, the Path Overhead consists of the following fields: B3 is a Bit-Interleaved Parity octet (BIP-8) for path error monitoring functions; C2 is allocated to indicate the construction and content of the STS SPE; H4 indicates the location of the start of the next MPEG-2 Systems transport packet envelope; and the remainder of the POH octets are currently unused. The MPEG-2 Systems transport packets are then mapped into the UNISON-1 STS-3c payload, as shown in FIG. 8, where the SPE payload consists of reserved (R) octets (currently unused), MPEG-2 Systems transport packets comprising 188 octet packets combining a variety of video, audio and private data into single or multiple streams for storage or transmission, and a Reed Solomon Parity bit (P) for error correction. The Reed Solomon Parity bit is preferably calculated over the preceding MPEG-2 Systems transport packet (188 octets), where the Reed Solomon code used for the parity calculation is a code which is implemented using a symbol size (M) of 8 bits and the polynomial $p(x)=x^8+x^7+x^2+x+1$ to generate a Galois Field of 256. Such techniques are believed to be known to those skilled in the art.

In order to keep emulation of frame bytes from occurring in the SPE, scrambling is employed. Preferably, a frame synchronous scrambler of sequence length 127 operating at the line rate is used. In a preferred embodiment, the generating polynomial is $1+x^6+x^7$. All bits to be scrambled are added, modulo 2, to the output from the $x^7$ position of the scrambler. Preferably, the scrambler runs continuously throughout the complete STS-3c frame illustrated in FIG. 6. However, the frame bytes and the identification bytes preferably are not scrambled.

Finally, concatenation refers to the transport condition of a SONET OC-N system where the entire SPE is treated as a single entity or contiguous data stream. When concatenation is implemented, the H1 and H2 octets are assigned predefined values. Preferably, the MPEG-2 Systems transport packets are mapped into the SPE and are then passed to the digital network 128 as a single contiguous entity.

4. Headend to STT Network Interface

The interface between the headend 112 and the STT 30 required for transporting service information to the STT 30 utilizes coaxial cable and a passband network topology along with a multi-rate transport (MRT) format. Preferably, the information will be transported in a 6 MHz envelope utilizing the Quadrature Amplitude Modulation (QAM) technique. In such a system, the service information is carried in the payload area of the MRT structure via an MPEG-2 Systems transport packet.

As shown in FIG. 2, the demultiplexer/modulator 50 encodes the UNISON-1 digital signal containing the MPEG-2 Systems transport packets into respective 6 MHz Quadrature Amplitude Modulated signals for transmission to the customer. In a preferred embodiment, the headend 112/STT 30 interface utilizes coaxial cable and a passband network topology along with an MRT format to transport the information from the SP 20 in a specified 6 MHz envelope utilizing a 64-QAM technique, where the data from SP 20 is carried in the payload area of the MRT structure via MPEG-2 Systems transport packets of the type described in the previous section.

a. Quadrature Amplitude Modulation (QAM)

Generally, Quadrature Amplitude Modulation (QAM) is used as a means of encoding digital information over wire or fiber transmission links. QAM is a combination of amplitude and phase modulation techniques and is an extension of multiphase phase shift keying, which is a type of phase modulation. As known by those skilled in the art, the primary difference between the two is the lack of constant envelope in QAM versus the presence of a constant envelope in phase shift keying techniques. QAM is used in the present invention because of its performance with respect to spectral efficiency.

QAM is closely related to the original non-return-to-zero (NRZ) baseband transmission. All QAM versions can be formed by generating two multilevel pulse sequences from the initial NRZ sequence and applying these to two carriers that are offset by a phase shift of 90° Each modulated carrier then yields an AM signal with suppressed carrier. Since multiplication in the time domain corresponds to a shift in the frequency domain, the modulation spectrum maintains the shape of the two-sided baseband signal spectrum.

QAM can have any number of discrete signal levels. Common levels are 4QAM, 16-QAM, 64-QAM, and 256-QAM. QAM is based on amplitude modulation of "quadrature" carriers which are 90° out of phase with each other. The spectrum of a QAM system is determined by the spectrum of the baseband signals applied to the quadrature channels. Since these signals have the same basic structure as the baseband PSK signals, QAM spectrum shapes are identical to PSK spectrum shapes with equal numbers of signal points. In other words, 16-QAM has a spectrum shape that is identical to 16-PSK, and 64-QAM has a spectrum shape identical to 64-PSK. However, even though the spectrum shapes are identical, the error performances of the two systems are quite different. With large numbers of signal points, QAM systems always outperform PSK systems since the distance between signal points in the PSK system is smaller than the distance between points in a comparable QAM system. Additional information regarding QAM modulation may be found in "IEEE Communications Magazine", Oct. 1986, Vol. 24, No. 10.

Each 6 MHz envelope of the interactive spectrum in accordance with the invention will transport digital information to the STT 30 as shown in FIG. 2. 64-QAM modulation is used for transport of the digital signals over an analog carrier in a preferred embodiment. Several simultaneous video programs can reside in a single 6 MHz envelope using digital encoding of a video signal. The information rate of a 64-QAM, 6 MHz envelope in accordance with the invention is, for example, 30 Mbps. Of the total, 3 Mbps are used for a Reed Solomon error correction signal so that the resulting net information rate is 27 Mbps. As a result, if 3 Mbps of digitally encoded video, data and audio is used for an interactive information service, then 9 simultaneous interactive information services can be transported over a single 6 MHz envelope.

b. Multi-rate Transport Format (MRT)

The aforementioned multi-rate transport (MRT) format is designed to work in a variety of transmission systems for providing a means of matching error protection to application requirements. A preferred format in accordance with the invention utilizes a combination of Reed-Solomon Forward Error Correction (FEC) and double octet interleaving to accomplish both random and burst error protection. The MRT format, as illustrated in FIG. 9, preferably comprises a mapping of MPEG-2 Systems transport packets with FEC into a 6 MHz envelope using the 64-QAM modulation described above.

Figure 9:
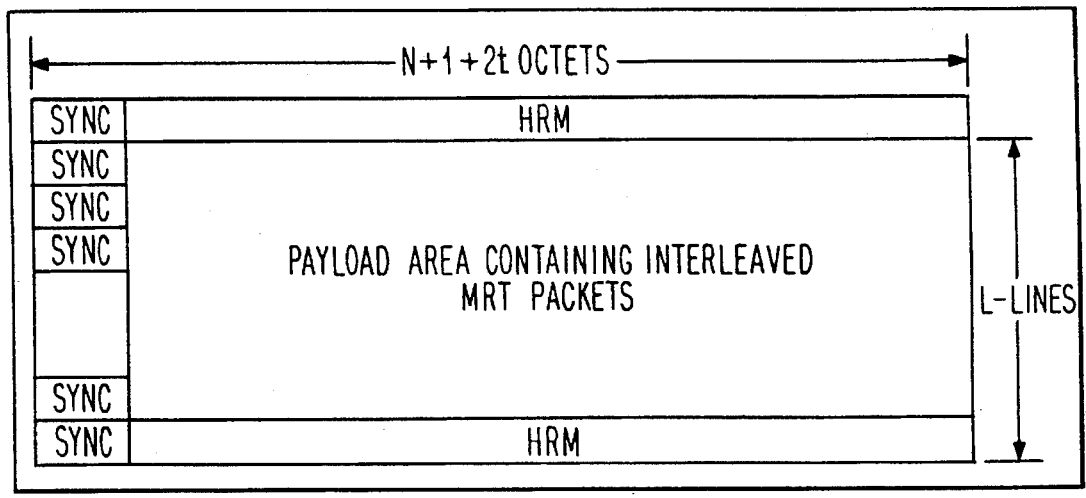
FIG. 9 illustrates the Multi-Rate Transport (MRT) frame structure used for transmitting MPEG-2 Systems transport packets from the headend 112 to the STT 30.

As shown in FIG. 9, the MRT format preferably comprises a synchronization octet at the beginning of each line and is used to aid in obtaining synchronization for the MRT transport structure. High reliability markers (HRMs) are also used for aid in obtaining synchronization for the MRT transport structure and for defining the boundaries of the interleave function. The High Reliability marker consists of two fields: (a) an (N+2t)/2 octet linear feedback shift register generated pattern, and (b) an (N+2t)/2 network specific field, where N is the MRT data packet length and t is the error correcting power of the Reed Solomon code (t=8 in a preferred embodiment). The default configuration for the network specific field is a continuation of the linear feedback shift register generated pattern. The High Reliability marker is sent in constant intervals defined by the High Reliability marker interval, L. L defines the boundaries of the interleave function, and in a preferred embodiment is equal to 205.

In a preferred embodiment, the MRT data packets comprise an N-bit data field and then 2t Reed Solomon parity bits. The data field of each packet is then scrambled using a linear feedback shift register generated pattern, and the result is encoded using a Reed Solomon algorithm to generate the Reed Solomon parity field. The resultant MRT data packets are double octet interleaved to the defined interleave depth and then placed into the MRT payload. In a preferred embodiment, the MRT packet size N is 188 octets, where each MRT packet contains exactly one MPEG-2 Systems transport packet. The aforementioned interleaving is then utilized in conjunction with the Reed Solomon code to provide protection against burst errors. The only constraint on the interleave depth is that it must be an integer multiple of the High Reliability marker interval (L-1). In a preferred embodiment, the interleave depth is 204 and double octet interleaving is utilized.

D. CMC Message Formats

Signalling between the STT 30 and the SP 20 across the L1 and L2 service boundaries is accomplished in accordance with the invention using the standard Internet Protocol (IP). In accordance with this protocol, each STT 30 and SP 20 has a unique physical address which is mapped to an IP address which is assigned to the STT 30 by the CMC 40. The STT 30 preferably has five addresses associated with it: a physical address (PA), an IP address (IPA), a receive message cell channel ID (MCCI) and message cell path ID (MCPI), a transmit message cell channel ID (MCCI) and message cell path ID (MCPI), and a broadcast message cell channel ID (MCCI) and message cell path ID (MCPI).

The physical address (PA) of the STT 30 is preferably a unique four octet number which is assigned to the STT 30 at the time of manufacture and used to identify an individual STT. The IP Address (IPA) is the network address that is assigned to the STT 30 by CMC 40 when the STT 30 is connected to the network. The IPA is used by the CMC 40 and the SP 20 to send messages to the STT after it has been provisioned. The receive, transmit, and broadcast MCCI/MCPI addresses are used by the QPSK transport to handle the segmentation and reassembly of the message cell packets (FIG. 5). In addition, a mask field may be maintained for each of these addresses to allow the assignment of an STT 30 to a particular group.

When the STT 30 is powered up and connected to the network of the invention, the STT 30 sends a provisioning request to the CMC 40 to get its IP address. The IP addresses of the available SPs 20 are similarly provisioned into the STT 30 by the CMC 40. In addition to the addresses which identify the STTs 30 and the SPs 20, communications packets may also contain a User Datagram Protocol (UDP) header which contains the specific port addresses for individual services within an STT 30, CMC 40 and/or SP 20.

IP messages may be mapped into a message cell transport packet as described above with respect to FIG. 5 and sent between the CMC 40 and the STT 30. Such message cells preferably comprise an ID header, a UDP header, and the message payload for the STT 30. The payload for the STT 30 message may have different bit lengths as desired. The resulting messages may then be sent between the CMC 40 and the SP 20 via Ethernet or between CMC 40 and QPSK modulator 124 using the standard IP format.

A technique is provided in accordance with the invention to allow mapping of the STT's physical address to the logical network address (IPA) as well as assigning the MCCI/MCPI addresses to the STTs 30. As known to those skilled in the art, the Boot Terminal Protocol (BOOTTERM) performs this function and provides additional provisioning as required by the STTs 30. BOOTTERM provides a common methodology for a host, such as a CMC 40, to provide startup parameters to networked devices, such as an STT 30 or SP 20. BOOTTERM is based on the standard BOOTP protocol which is specified in the Internet RFC 951. Due to the bandwidth limitations of the slotted ALOHA link over which BOOTTERM operates in accordance with the invention, several of the BOOTP fields have been eliminated. The BOOTTERM packet is designed to be passed in two message cells and relies-on a BOOTTERM server on the CMC 40 to maintain a database of STTs which it uses to assign IPAs to the STTs 30. The BOOTTERM protocol dynamically assigns an IPA to any STT 30 that sends a BOOTTERM request.

In a preferred embodiment, SP 20 and STT 30 address resolution and assignment are accomplished by assigning each STT 30 a 32-bit physical address at manufacture time and, after initialization time, having the STT 30 request provisioning using the BOOTTERM protocol. CMC 40 then assigns IPA and MCCI/MCPI addresses to the STT 30 using BOOTTERM and maintains a database which maps the PA to IPA and MCCI/MCPI addresses. The BOOTTERM packet preferably contains an SP specific area based on the term type and version. BOOTTERM messages are preferably broadcast to the STTs 30 encapsulated in message cells.

Figure 10:
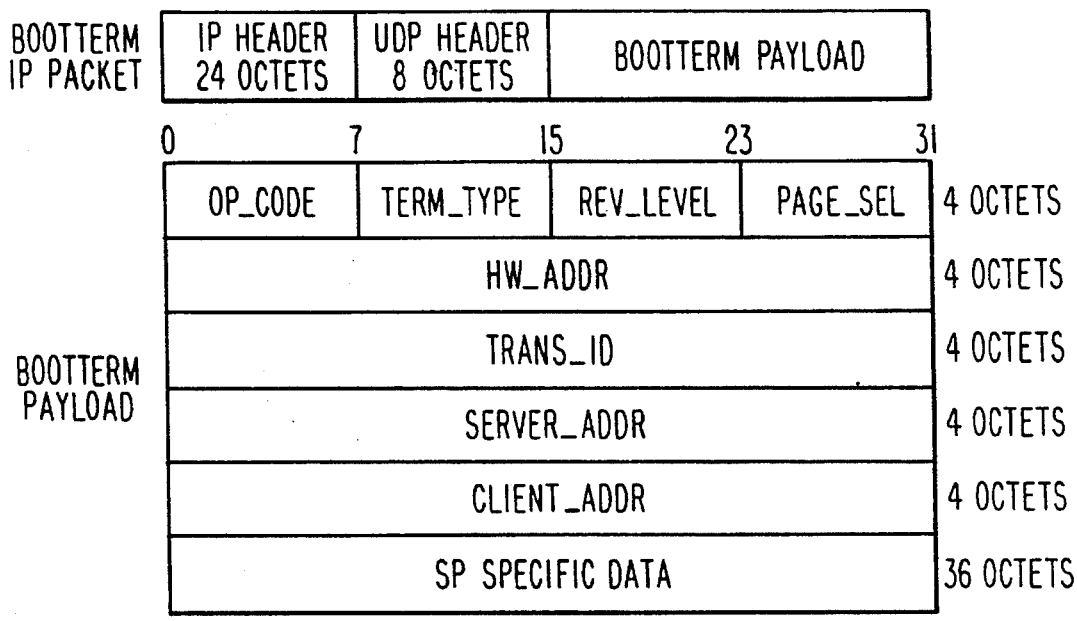
FIG. 10 illustrates the format of a BOOTTERM message packet for physical address to IP address (IPA) address resolution.

As shown in FIG. 10, a BOOTTERM IP message packet preferably comprises a standard 24 octet IP Header, an 8 octet UDP Header, and a BOOTTERM payload. The destination address of the IP Header indicates that the message is broadcast to all STTs 30 if the message is from the CMC 40 or is broadcast to all CMCs 40 if the message is from an STT 30. The source address is a zero if the STT 30 initiated the message, but if the message is a response from the CMC 40, the source address contains the address of the CMC 40 which is responding to the request. The UDP Header contains the source and destination port address of the BOOTTERM server on the CMC 40 and the BOOTTERM processor on the STT 30.

The BOOTTERM payload preferably is formatted as shown in FIG. 10. The OP_CODE field in the BOOTTERM payload contains a "1" if the BOOTTERM packet is a request and a "0" if the BOOTTERM packet is a response. The $TERM_{13}$ TYPE field identifies the type of STT 30 known to the CMC 40 which sent the BOOTTERM request, while the $REV_{13}$ LEVEL field identifies the revision level of the terminal firmware. The PAGE_SEL field identifies which page of the SP specific data the present command is addressing. Preferably, there are 9 four octet registers defined for each page of the SP specific data, while up to 256 pages of SP specific data may be defined on an STT 30. Page zero of the SP specific data preferably contains the MCCI/MCPI addresses. The $HW_{13}$ ADDR field contains the PA of the STT 30 and is filled in by the STT 30 when it sends the BOOTTERM request. The $TRANS_{13}$ ID field is a serialized field that is created by the STT 30 and incremented for each BOOTTERM request. The $SERVER_{13}$ ADDR field is filled in by the BOOTTERM server which responds to the request and is the address that the STT 30 uses for all subsequent IP messages. The CLIENT_ADDR field is assigned by the BOOTTERM protocol. This is the IPA that is assigned by the CMC 40 and becomes the IPA of the STT 30 for all subsequent IP messages.

The 36 octet SP Specific Data field supplies provisioning parameters to the STT 30. The CMC 40 assigns this data based on both the TERM TYPE and REV LEVEL. The 36 octets are preferably separated into 9 four octet registers, and this area of SP specific data is referred to as a page. As noted above, there can be up to 256 pages of SP specific data defined. The pages are selected using the $PAGE_{13}$ SEL field in the BOOTTERM payload.

Those skilled in the art will appreciate that these techniques also may be used to allow respective STTs to communicate with each other over a dedicated network so that, for example, the respective users may establish a connection which will, once established, permit the users to play against each other in an interactive video game from remote locations.

In the previous sections, the signalling interfaces between STT 30 and the headend 112 and between the headend 112 and SP 20 have been described in detail. Such a communication system is provided in accordance with the invention for establishing an information session connection (ISC) which allows the transmission of command messages between the SP 20 and the STT 30 in order to provide truly interactive information services such as movie on demand, on-line data retrieval, shop at home services, and the like which allow customer interaction during the presentation of the information. The present section describes sample command messages which may be sent between the CMC 40 and both the SP 20 and STT 30 for establishing and maintaining an information session connection (ISC) for an interactive information session between the SP 20 and STT 30 for the provision of interactive information services. Examples describing how these messages are used in the establishment of a Video Session Connection will then be described in sections E–G below.

1. CMC⇆STT Commands

The STT Session Set-Up command is issued by the STT 30 when it requests that a session be established with its designated SP 20. Any set-up data that is required by the SP 20 may be passed in this command by placing the length of the data in a SP__DATA__LEN field and the data in a $SP_{13}$ DATA field. The SP__DATA field thus allows additional data to be passed to the SP 20 as part of the service request.

The STT Session Set-Up Acknowledge command is sent from the CMC 40 to the STT 30 in response to the STT Session Set-Up command. The acknowledge is issued after the session set-up has been processed by SP 20 and contains an acknowledgement (ACK) in a RESPONSE field if the SP 20 accepted the request and there are resources available to process the request. No acknowledgement (NAK) will be returned in the RESPONSE field if the SP 20 rejects the request or insufficient resources are available. This command may also include a SESSION__ID identifier that the CMC 40 assigns to the requested session which is used to reference this session in all future messages.

The Session Connect Request command is issued by the STT 30 to connect to a session that is currently set-up. This may be a session that the STT 30 has previously requested or a "continuous feed" session which is predefined in the STT 30 and is constantly being transmitted by the SP 20. This command merely needs to reference the $SESSION_{13}$ ID parameter specifying the ID of the session for which the STT 30 is requesting a connection. This session may be one that was requested by the STT 30 or a continuous feed session such as an electronic program guide or information channel. A data controller for an electronic program guide and a text channel source is described by way of example in U.S. patent application Ser. No. 08/072,911, filed Jun. 7, 1993, and assigned to the same assignee as the present application. Continuous feed sessions preferably have predefined $SESSION_{13}$ IDs which are stored in the STT 30.

The STT Session Provision command is issued to the STT 30 by CMC 40 after the STT 30 has requested a session connect. This command contains the information necessary for the STT 30 to connect to the session. For example, the STT Session Provision command includes: the SESSION__ID parameter for identifying the ID of the session to which the information pertains; a CHANNEL parameter which identifies the portion of the bandwidth on which the session is being transmitted (i.e., the frequency to which the STT 30 must tune to receive the service); the $TDMA_{13}$ CHNL, $TDMA_{13}$ START, $TDMA_{13}$ CNT, $TDMA_{13}$ DIST parameters for providing TDMA as described above with respect to FIG. 4; and an MPEG__PROG parameter which is the MPEG-2 program number on which the service is being transmitted.

The STT Session Provision Acknowledge command is used by the STT 30 after the STT 30 has connected to the indicated service using the parameters supplied by the STT Session Provision command. The SESSION__ID field contains the ID of the session, the RESPONSE field contains an ACK if the STT 30 accepted the provisioning, while a NAK will be returned in the RESPONSE field if the STT 30 rejected the provisioning.

The STT Continuous Session Set-up command is issued by the STT 30 when it wants to connect to a continuous feed session such as an electronic program guide. Any set-up data that is required by the SP 20 may be passed in this command by placing the length of the data in the $SP_{13}$ $DATA_{13}$ LEN field and the data in the SP__DATA field.

The STT Session Disconnect command is issued by either the STT 30 or by the CMC 40 to indicate that a session should be terminated. The STT 30 sends this command if it disconnects from a session. The CMC 40 sends the command to instruct the STT 30 to disconnect from a session. If the session is one that the STT 30 set up, the CMC 40 will issue an STT Session Release command (see below) when the STT acknowledges that the session is disconnected.

The STT Session Disconnect Acknowledge command is issued by the STT 30 in response to an STT Session Disconnect command which has been issued to the STT 30 from the CMC 40, while the STT Session Disconnect Acknowledge command is issued by the CMC 40 in response to an STT Session Disconnect command which has been issued to the CMC 40 from the STT 30. The SESSION__ID field contains the ID of the session, while the RESPONSE field contains an ACK if the STT 30 or CMC 40 accepted the command. A NAK will be returned in the RESPONSE field if the STT 30 or CMC 40 rejects the disconnect command.

The STT Session Release command is issued to the STT 30 from the CMC 40 to indicate that a session should be torn down and all resources allocated for that session released. The CMC 40 sends the command after the indicated session has been disconnected. This command is only issued for sessions which were initiated by the STT 30. "Continuous feed" sessions cannot be torn down by an STT 30.

The STT Session Release Acknowledge command is issued by the STT 30 in response to an STT Session Release command which has been issued to the STT 30 from the CMC 40. The SESSION__ID field contains the ID of the session, while the RESPONSE field contains an ACK if the STT 30 accepted the release command and a NAK will be returned in the RESPONSE field if the STT 30 rejects the release command.

The STT Session In Progress command is issued periodically by the STT 30 to inform the CMC 40 that the session is still active. This message is used as a sort of "watchdog timer" by the CMC 40 which determines if the link between the STT 30 and the CMC 40 is active. This message also sends performance and billing information to the CMC 40, such as performance monitoring information and active session traffic assessment. The CMC 40 maintains a last contact time register for each active session. If that time reaches a predefined threshold, the STT 30 is assumed to be out of service and the session is torn down.

The STT Status Request command is issued by the CMC 40 to instruct the STT 30 to transmit a status message. The CMC 40 can request various types of status information which is maintained at the CMC 40 for diagnostic and maintenance purposes. An STT Status message may thus be issued by the STT 30 either in response to the STT Status Request command or unsolicited if the STT 30 detects a problem.

The STT Re-Allocate TDMA Slots command is issued by the CMC 40 to the STT 30. This command issues a new TDMA time slot configuration to the STT 30; however, the STT 30 does not necessarily immediately begin using the new allocation. A second command, STT Switch TDMA Slot Assignment, must be broadcast to all STTs 30 on the network so that they may all begin using the new assignments at the same time. This command thus requires the TDMA $_{13}$ CHNL, TDMA $_{13}$ START, TDMA $_{13}$ CNT and TDMA $_{13}$ DIST parameters described above with respect to FIG. 4.

The STT Re-Allocate TDMA Slots Acknowledge command is issued by the STT 30 in response to an STT RE-Allocate TDMA Slots command which has been issued to the STT 30 from the CMC 40. The SESSION_ID field contains the ID of the session, and the RESPONSE field contains an ACK if the STT 30 or the CMC 40 accepted the reallocation, while a NAK will be returned in the RESPONSE field if the STT 30 or CMC 40 rejected the reallocation.

The STT Switch TDMA Slot Allocation command is broadcast to all STTs 30 on the network. This command instructs the STTs 30 to begin using the reallocated TDMA time slots which have previously been sent to the individual STTs 30. As noted above, this command is sent as a broadcast to all STTs 30 which will begin using the new allocations at the same time. When an STT 30 receives this command, it waits until the beginning of the TDMA time slots before it uses the new allocation. This is to ensure that the STTs 30 do not get into a "race" condition where some STTs 30 receive the command and begin using the new assignments before the other STTs 30.

2. SP⇆CMC Commands

The SP Session Set-Up command is sent from the CMC 40 to the SP 20 when the STT 30 requests that a session with that SP 20 be established. Any information passed from the STT 30 to the CMC 40 in the SP_DATA parameter is passed in this command.

The SP Session Set-Up Acknowledge command is sent from the SP 20 to the CMC 40 in response to the SP Session Set-Up command. If the RESPONSE field is an ACK, the UNISON-1 input channel (INPUT_CHNL) that the SP 20 will use to input data into digital network 128, required data rate for the service (DATARATE), required number of MPEG-2 Systems transport PIDs (PID_CNT) for the service, and the requested number of TDMA time slots (TDMA _CNT) are returned to the CMC 40 so that the CMC 40 can allocate the necessary resources. CMC 40 will attempt to allocate at least the number of time slots specified by the TDMA $_{13}$ CNT parameter in a reverse signalling path. However, due to the overall system load, a lesser number may be allocated if necessary. If this number is zero, the CMC 40 will allocate a number of TDMA time slots to the service based on current system loading.

The SP Session Provision command is issued by the CMC 40 after it has allocated the bandwidth on the demultiplexer/modulator 50 for the indicated service. This command contains the MPEG-2 Systems transport PIDs and the MPEG-2 program number that the SP 20 will use to carry the service. This command also includes the INPUT_CHNL parameter which specifies the UNISON-1 input channel that the CMC 40 is expecting the service to be transmitted on. The parameters specifying the MPEG-2 program number that the SP 20 will use to transport this service (MPEG_PROG), the number of MPEG-2 Systems transport PIDs assigned to this service (PID$_{13}$ CNT), and a list of the MPEG-2 Systems transport PIDs assigned to this service (PID$_{13}$ 1-PID_n) may also be passed with this command.

The SP Session Provision Acknowledge command is sent from the SP 20 to the CMC 40 in response to the SP Session Provision command. The RESPONSE field contains an ACK if the STT 30 or CMC 40 accepted the provisioning, while a NAK will be returned in the RESPONSE field if the STT 30 or CMC 40 rejected the provisioning. An ACK response implies that the SP 20 has set up the service and connected to the circuit. Upon receipt of this command, the CMC 40 issues an STT Set-Up Acknowledge command to the STT 30 which allows the STT 30 to connect to the service.

The SP Continuous Session Set-Up command is sent from the SP 20 to the CMC 40 to set up a "continuous feed" session such as when a data service or an electronic program guide is used. These types of sessions are always running and connected to the network at the service provider end. An STT 30 may connect to these sessions at any time by sending an STT Continuous Session Set-Up command to the CMC 40. This command must specify the requested UNISON-1 input channel (INPUT$_{13}$ CHNL), the required data rate (DATARATE), the required number of MPEG-2 Systems transport PIDs (PID$_{13}$ CNT), and the requested number of TDMA time slots (TDMA _CNT).

The SP Session Connect Request command is sent from the CMC 40 to the SP 20 when the STT 30 requests a connection to a service.

The SP Session Connect Acknowledge command is sent from the SP 20 to the CMC 40 in response to the SP Session Connect Request command. The RESPONSE field contains an ACK if the SP 20 accepted the connection, while a NAK will be returned in the RESPONSE field if the SP 20 rejected the connection.

The SP Session Disconnect command is issued by either the SP 20 or the CMC 40 to indicate that a session should be terminated. The SP 20 sends this command if it disconnects from a session, while the CMC 40 sends this command to instruct the SP 20 to disconnect from a session.

The SP Session Disconnect Acknowledge command is sent in response to the SP Session Disconnect command. If the CMC 40 issued the request, the acknowledge is sent from the SP 20 to the CMC 40. However, if the SP 20 issued the request, the acknowledge is sent from the CMC 40 to the SP 20. The RESPONSE field contains an ACK if the STT 30 or CMC 40 accepted the disconnect request, while a NAK will be returned in the RESPONSE field if the STT 30 or CMC 40 rejected the disconnect request.

The SP Session Release command is issued from the CMC 40 to the SP 20 to indicate that a session should be torn down and all resources allocated for that session be released. The CMC 40 sends this command to the SP 20 after the indicated session has been disconnected.

The SP Session Release Acknowledge command is sent to the CMC 40 by the SP 20 in response to the SP Session Release command. The RESPONSE field contains an ACK if the SP 20 accepted the release request, while a NAK will be returned in the RESPONSE field if the SP 20 rejected the release request.

The SP Session In Progress command is issued periodically by the SP 20 to inform the CMC 40 that the session is still active. This message is used as sort of a "watchdog timer" by the CMC 40 which determines if the link between the SP 20 and the STT 30 is still active. The CMC 40 maintains a last contact time register for each active service, and if that time reaches a predefined threshold, the SP 20 is assumed to be out of service and the session is torn down.

The SP Status Request command is issued by the CMC 40 to instruct the SP 20 to transmit a status message. The CMC 40 can request various types of status information which is maintained at the CMC 40 for diagnostic and maintenance purposes. The SP Status command is issued by the SP 20 either in response to the SP Status Request command or unsolicited if the SP 20 detects a problem.

3. STT⇔SP Commands

The STT Pass Through Message command is used to send a message from a session on the STT 30 directly to the SP 20. This command includes a message length parameter (MESSAGE$_{13}$ LEN) and the body of the message (MESSAGE). There is no acknowledgment to this message since it is specific to the particular session.

The SP Pass Through Message command is used to send a message from the SP 20 to a session on the STT 30. This command also includes the MESSAGE_LEN and MESSAGE parameters and also does not require an acknowledgement.

The STT Broadcast Message command is broadcast from the CMC 40 with parameters MESSAGE_LEN and MESSAGE to the entire population of STTs 30. There is no acknowledgement to this message.

The SP Broadcast Message command is sent from the SP 20 to the CMC 40 where it is broadcast to the entire population of STTs 30 using the STT Broadcast Message command. There is also no acknowledgement to this message.

The STT Procedure Error command is sent between the STT 30 and the CMC 40 to indicate that a processing error has occurred. The reason for the procedure error is returned in a status code field (STAT_CODE).

The SP Procedure Error command is sent between the SP 20 and the CMC 40 to indicate that a processing error has occurred, and the reason for the procedure error is returned in the STAT_CODE field.

Of course, other commands and messages may be utilized by those skilled in the art in a manner consistent with the description given herein.

E. CMC⇔STT Session Management

Figure 11:
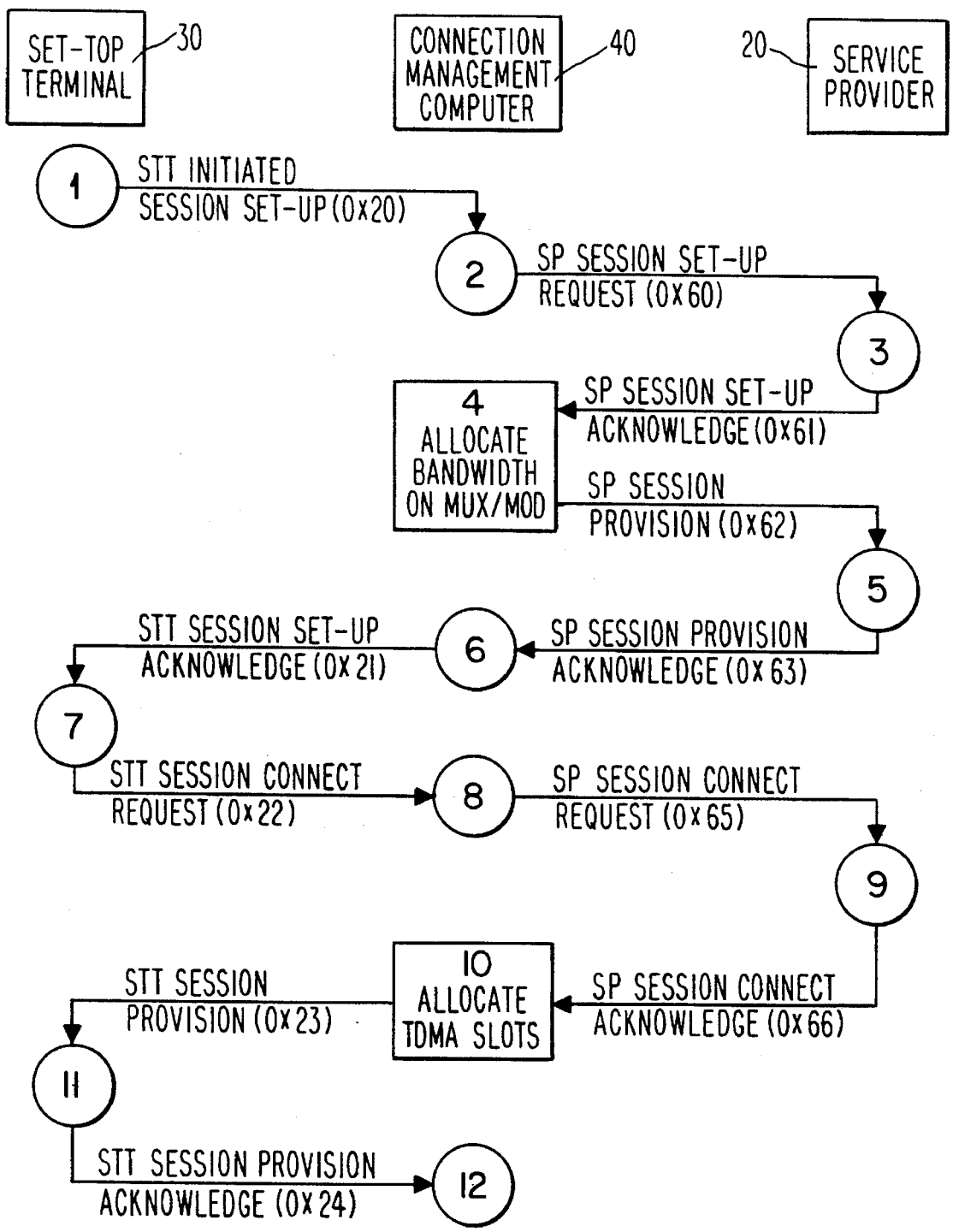
FIG. 11 illustrates the sequence of events that occurs during a session set-up initiated by the customer's set top terminal.

Session management messages of the type noted above which are transmitted between the CMC 40 and the STT 30 for establishing a Video Session Connection fall into three categories: Session Set-Up Commands, Session Tear-Down Commands and Session Status Commands. When the STT 30 requests a session, an STT Session Set-Up command is issued by the STT 30. That command requests that a service be established and that a path to that service be allocated. When the service has been allocated, the STT 30 then issues an STT Session Connect Request command to the CMC 40 to get the session parameters from the CMC 40 which allow the STT 30 to connect to the session. FIG. 11 illustrates the sequence of events that occurs during such an STT 30 initiated session set-up.

As shown in FIG. 11, at stage 1, the STT 30 sends an STT Session Set-Up command to the CMC 40. At stage 2, the CMC 40 sends an SP Session Set-Up command to the SP 20. At stage 3, the SP 20 determines if the request can be processed and, if the response is an ACK, SP 20 returns an SP Session Set-Up Acknowledge command which contains the required data rate, the number of MPEG-2 System transport PIDs, the desired UNISON-1 input channel, and the desired number of TDMA time slots to the CMC 40. On the other hand, if the response is a NAK at stage 3, a NAK response is sent to the STT 30 in the STT Session Set-Up Acknowledge command and the set-up sequence terminates.

At stage 4, the CMC 40 allocates a portion of the output bandwidth of the demultiplexer/modulator 50 for the new service and assigns the required number of MPEG-2 Systems transport PIDs and the MPEG-2 program number to the service. An SP Session Provision command is then sent at stage 4 to the SP 20 which contains the MPEG-2 program number and the MPEG-2 Systems transport PIDs which will be used for the session, as well as the UNISON-1 input channel on which the CMC 40 is expecting the program to be input. SP 20 then connects to the network at stage 5 and sends an SP Session Provision Acknowledge command to the CMC 40 which indicates that the SP 20 is connected to the network and the service is active. At stage 6, the CMC 40 sends an STT Session Set-Up Acknowledge command to the STT 30 to inform the STT 30 that the requested service is now available.

At stage 7, the STT 30 issues an STT Session Connect Request command to the CMC 40 with the session ID of the service. At stage 8, the CMC 40 sends an SP Session Connect Request command to the SP 20. At stage 9, the SP 20 sends an SP Session Connect Acknowledge command back to the CMC 40. At stage 10, the CMC 40 then assigns the number of TDMA time slots in the reverse channel to the service and issues an STT Session Provision command to the STT 30 which contains the channel frequency of the service, the TDMA allocation, and the MPEG-2 program number on which the service is being transmitted. Finally, at stage 11, the STT 30 connects to the service using the provisioning parameters and sends an STT Session Provision Acknowledge command to the CMC 40 at step 12 to inform the CMC 40 that the session is now established.

A Video Session Connection in accordance with the invention is now established, and the customer may send fast-forward, pause, rewind, and other interactive commands to the SP 20 which is providing the program currently being presented to that customer.

Figure 12:
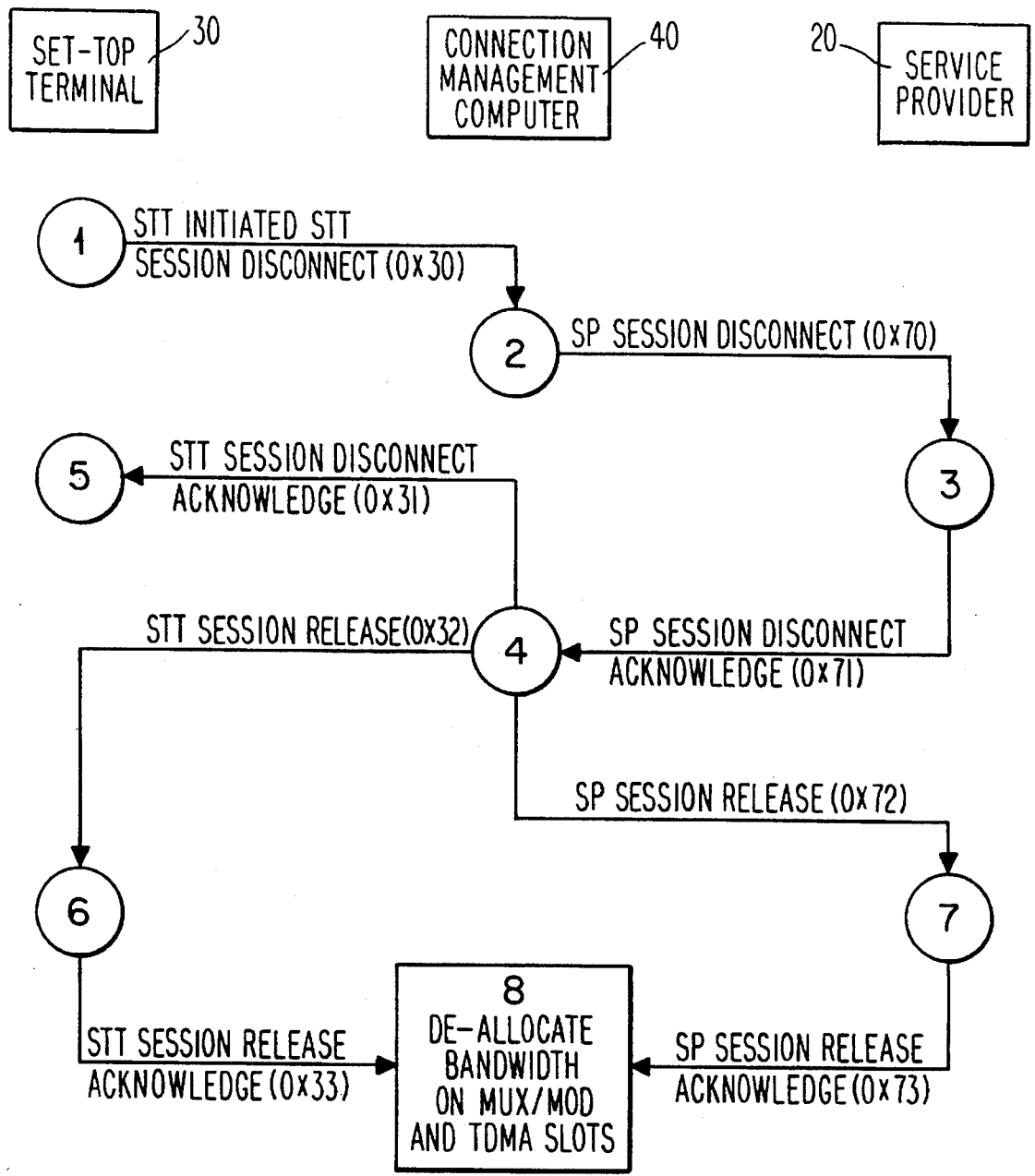
FIG. 12 illustrates the sequence of events that occurs during a session tear-down initiated by the customer's set top terminal.

After a session (Video Session Connection) has been established, it may be terminated using the session disconnect and session tear-down commands. Session tear-down may be initiated by either the STT 30 or the CMC 40. However, only sessions that have been set up by the STT 30 may be torn down. Continuous feed sessions established by the SP 20 must be torn down by SP 20. FIG. 12 describes a sequence of events that occur during an STT 30 initiated session tear-down.

As shown in FIG. 12, at stage 1, the STT 30 sends an STT Session Disconnect command to the CMC 40. At stage 2, the CMC 40 sends an SP Session Disconnect command to the SP 20, which sends an SP Session Disconnect Acknowledge command back to the CMC 40 at stage 3. At stage 4, the CMC 40 then sends an STT Session Disconnect Acknowledge command to the STT 30 (stage 5). At stage 4, the CMC 40 also sends an STT Session Release command to the STT 30 and an SP Session Release command to the SP 20. At stage 6, the STT 30 sends an STT Session Release Acknowledge command to the CMC 40, and at stage 7, the SP 20 sends an SP Session Release Acknowledge command to the CMC 40. At this point, the session has been terminated and, accordingly, at stage 8 the CMC 40 deallocates the bandwidth on the demultiplexer/modulator 50 and releases the TDMA time slots on the reverse channel. There is no need to send a provisional TDMA command to the STT 30 to release the TDMA time slots since the STT Session Release command automatically releases the TDMA time slots allocated for that session.

As noted above, after a session (and Video Session Connection) has been established, the CMC 40 can dynamically reallocate the TDMA time slots that the STT 30 is using for that session. In such a case, the CMC 40 sends an STT Re-Allocate TDMA Slots command to the STT 30. The STT 30 stores the new TDMA time slot assignments but does not begin using them. The STT 30 sends an STT Re-Allocate TDMA Slots Acknowledge command to the CMC 40. After the TDMA time slots have been reassigned on all STTs 30, the CMC 40 then broadcasts an STT Switch TDMA Slot Allocation command to the entire population of STTs 30, which begin using the new time slot allocations at the beginning of the next TDMA cycle.

Other transactions between the CMC 40 and the STT 30 using the above commands will be apparent to those skilled in the art.

F. CMC⇆SP Session Management

Figure 13:
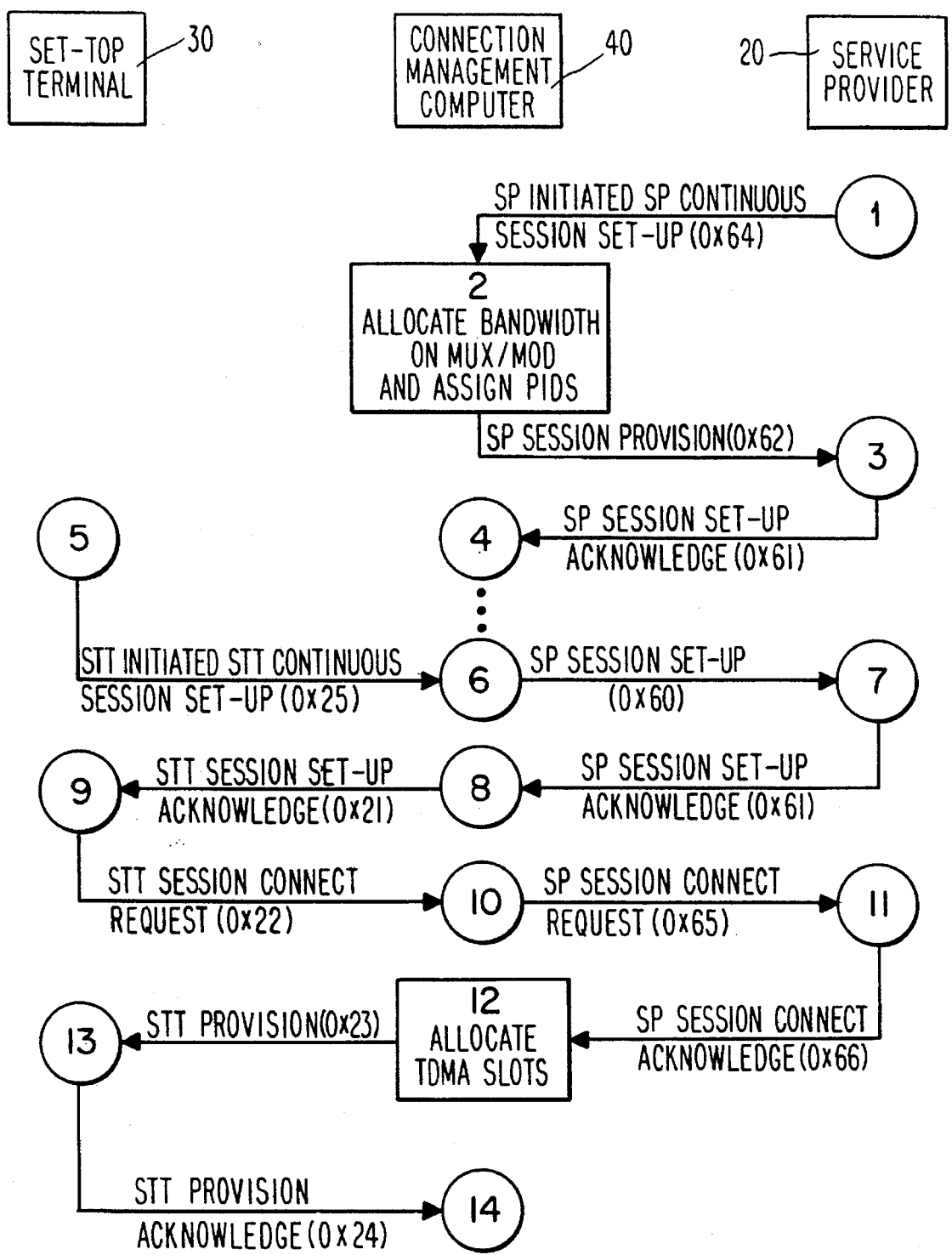
FIG. 13 illustrates the sequence of events that occurs during a continuous feed session set-up established by the service provider.

The CMC 40⇆SP 20 session management messages also fall into three categories: Session Set-Up Commands, Session Tear-Down Commands and Session Status Commands. The SP 20 may set up some "continuous feed" sessions without receiving a request from a STT 30. The SP 20 should allow any number of STTs 30 to connect with these continuous feed sessions, but only the SP 20 can tear down these sessions. FIG. 13 illustrates the sequence of events that occur during the set-up of a continuous feed session by SP 20.

As shown in FIG. 13, at stage 1, the SP 20 sends an SP Continuous Session Set-Up command to the CMC 40 which contains the session ID (which is in a predefined range of IDs for continuous feed sessions), the required data rate, the number of MPEG-2 Systems transport PIDs required for the session, the desired UNISON-1 input channel, and the desired number of TDMA time slots for each STT connected to the session. At stage 2, the CMC 40 allocates a portion of the output bandwidth of the demultiplexer/modulator 50 for the new service and assigns the required number of MPEG-2 Systems transport PIDs and an MPEG-2 program number to the service. An SP Session Provision command is then sent from the CMC 40 to the SP 20 which contains the MPEG-2 Systems transport PIDs, the MPEG-2 program number and the UNISON-1 input channel that will be used for the session. However, if the CMC 40 cannot allocate the resources using the requested UNISON-1 input channel, it will attempt to allocate the service using an alternate UNISON-1 input channel. Then, if this allocation is successful, the alternate UNISON-1 input channel will be returned to the SP 20 in the SP Session Provision command. If the SP 20 cannot accept this alternate UNISON-1 input channel, the session should be torn down. At stage 3, the SP 20 then connects to the network and sends an SP Session Provision Acknowledge command to the CMC 40 which indicates that the SP 20 is connected to the network and the service is available. At this time, the session ID is available to any number of STTs 30 that wish to connect to the service.

When an STT 30 wishes to connect to the continuous feed service, it sends an STT Continuous Session Set-Up command to the CMC 40 at stage 5. At stage 6, the CMC 40 sends an SP Session Set-Up command to the SP 20 with the Session ID set to zero. The SP 20 sends an SP Session Set-Up Acknowledge command back to the CMC 40 at stage 7. Only the SESSION$_{13}$ ID and RESPONSE fields have values when the SP 20 acknowledges a STT Continuous Session Set-Up command for a continuous feed session. At stage 8, the CMC 40 sends an STT Session Set-Up Acknowledge command back to the STT 30 which contains the response from the SP 20. If RESPONSE is ACK, the STT 30 is allowed to continue with the connection sequence. However, if RESPONSE is NAK, the request is denied and the sequence is terminated.

At stage 9, the STT 30 then sends an STT Session Connect Request message to the CMC 40. At stage 10, the CMC 40 sends an SP Session Connect Request command to the SP 20. At stage 11, the SP 20 then sends an SP Session Connect Acknowledge command back to the CMC 40. At stage 12, the CMC 40 then allocates the TDMA time slots for the session and sends an STT Session Provision command to the STT 30 which contains the frequency, TDMA allocation and MPEG-2 program number that the STT 30 needs to connect to the service. At stage 13, the STT 30 sends an STT Session Provision Acknowledge command to the CMC 40. If the response is positive, the session is established at stage 14 and all further communications are sent between the STT 30 and the SP 20 directly, using the reverse signalling path. The continuous feed session may now be received by the STT 30.

Figure 14:
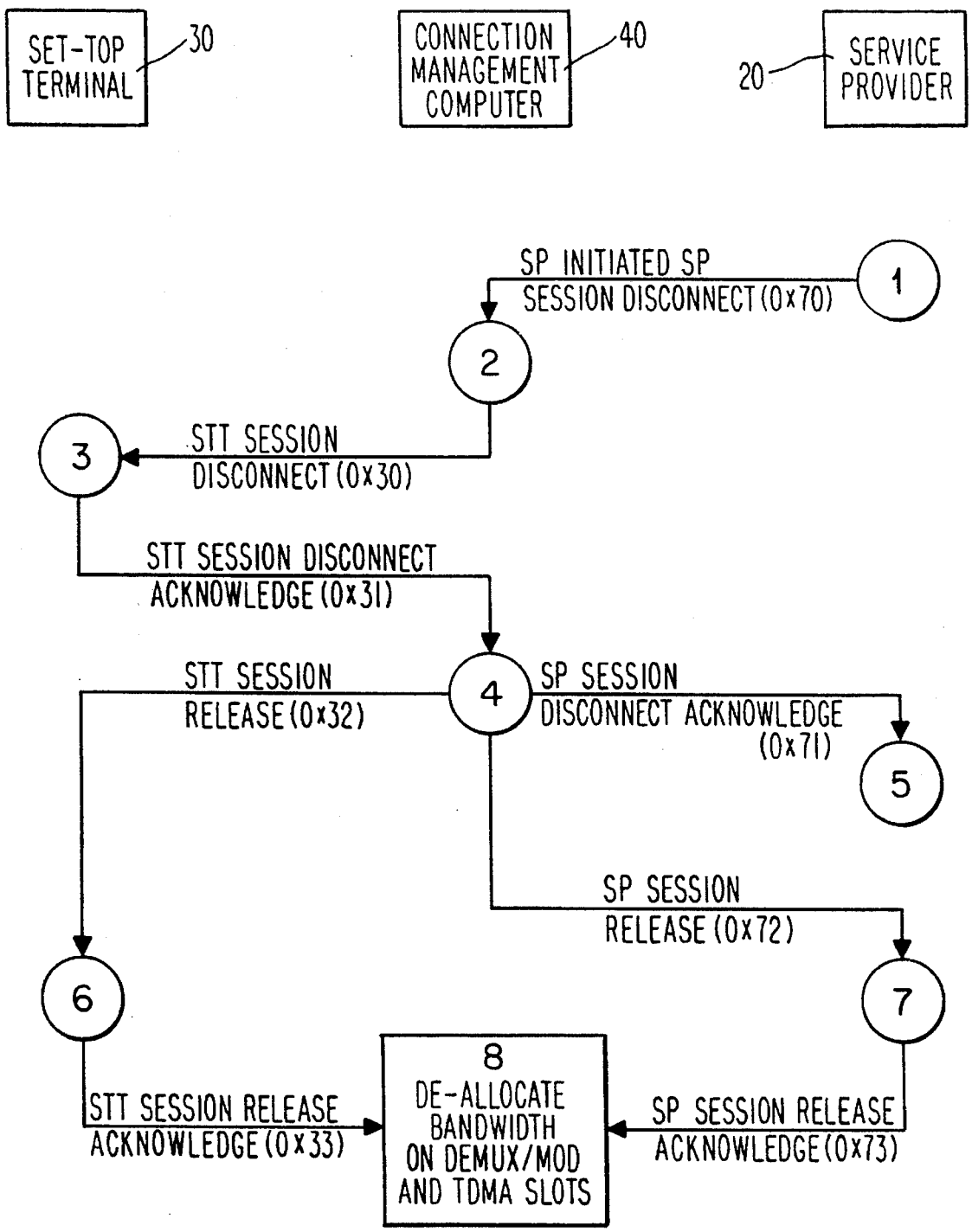
FIG. 14 illustrates the sequence of events that occurs during a session tear-down initiated by the service provider.

After a continuous feed session has been established, it may be terminated using the session tear-down commands. As noted above, an SP Session Disconnect command may be initiated by either the SP 20 or the CMC 40. FIG. 14 illustrates the sequence of events that occur during an SP 20 initiated session tear-down.

As illustrated in FIG. 14, at stage 1, the SP 20 sends an SP Session Disconnect command to the CMC 40. At stage 2, the CMC 40 sends an STT Session Disconnect command to the STT 30 (stage 3). In the case of a continuous feed application, the STT Session Disconnect command is sent to all STTs 30 which are currently connected to the session. Each STT 30 then sends an STT Session Disconnect Acknowledge command back to the CMC 40 at stage 4, and CMC 40 sends an SP Session Disconnect Acknowledge command to the SP 20 (stage 5). The tear-down session then continues at stage 4. The CMC 40 then sends an STT Session Release command to the STT 30 and an SP Session Release command to the SP 20. At stage 6, the STT 30 sends an STT Session Release Acknowledge command to the CMC 40, and, at stage 7, the SP 20 sends an SP Session Release Acknowledge command to the CMC 40. At this point, the session has been terminated. The CMC deallocates the bandwidth on the demultiplexer/modulator 50 and releases the TDMA time slots on the reverse path at stage 8.

G. Pass Through and Broadcast Messages

After a session (Video Session Connection) has been established, the STT 30 and SP 20 may communicate between themselves using the pass-through message commands. These commands pass the message portion of the command to the other end of the session without intervention of the CMC 40. The pass-through message may be sent in either direction. For example, the STT Pass Through Message command bypasses the CMC 40 and is routed directly to the SP 20 which routes the message to the service indicated by the SESSION$_{13}$ ID. On the other hand, the SP Pass Through Message command is initiated by the SP 20 and also bypasses the CMC 40 and is directly routed to the STT 30.

When a Broadcast message command is initiated by the SP 20 for sending to the entire population of STTs 30 or to an individual STT 30, the SP 20 sends an SP Broadcast Message command to the CMC 40. The CMC 40 then rebroadcasts the message to the STT 30 indicated by the Internet protocol address in the message header using the STT Broadcast Message command. The Internet Protocol address may be an individual STT 30 address or may be a Class D broadcast address which will cause the message to be sent to the entire population of STTs 30.

Those skilled in the art will readily appreciate that many modifications to the invention are possible within the scope of the invention. For example, the techniques described herein are not limited to the provision of video services information. Other types of digital information services such as CD-ROM libraries, digital audio, interactive video games (user to user), long distance learning and the like, may be accessed using the packet based digital networking techniques described herein in which different services with different program IDs (PIDs) are sent via different channels to different users connected to a digital network adapted to carry compressed video packets and the like. The acquired data may be displayed on a television, broadcast over a stereo system, displayed on a CRT, or presented to the requester in some other known manner. Of course, a video headend in the conventional sense is not required; instead, the connection management controller 40 may be provided at a central information point for establishing the communications in accordance with the techniques herein described. Subsequent communications may follow other known communications protocols and different modulation schemes. Accordingly, the scope of the invention is not intended to be limited by the preferred embodiment described above but only by the appended claims.

What is claimed:

1. An interactive information services system for providing at least one of video, audio, and data programs requested by a customer from a data service provider (SP) and routing a requested program over a transmission link having a predetermined bandwidth to a set top terminal (STT) associated with an information presentation device of said customer, and for providing said customer with real-time interactive access to said requested program during presentation of said requested program to said STT by said SP, comprising:

a unidirectional communication path from said SP to a plurality of STTs including said customer's STT for providing said requested program to said customer's STT for presentation of said requested program via said customer's information presentation device, said unidirectional communication path including said transmission link; and a bi-directional communication path between said STT and said SP for communicating data and presentation control commands between said STT and said SP during presentation of said requested program to said customer's information presentation device, said bi-directional communication path also including said transmission link, wherein said presentation control commands initiate and control presentation of said requested program on said information presentation device in a real-time manner.

2. An interactive information services system as in claim 1, wherein said transmission link comprises at least one of optical fibers, a satellite communications link, an over the air communications link, and a cable connecting said STT to a connection management computer which, in turn, provides said requested program from said SP via said transmission link to said customer's STT.

3. An interactive information services system as in claim 1, wherein said SP comprises means for digitizing and compressing said requested program into asynchronous data packet streams prior to transmission of said requested program over said unidirectional communication path to said customer's STT.

4. An interactive information services system as in claim 3, wherein said unidirectional communication path comprises:

means for multiplexing said data packet streams into a synchronous data payload envelope of a predetermined format;

a demultiplexer which demultiplexes said data packet streams from said synchronous data payload envelope;

modulation means responsive to said demultiplexer for modulating said data packet streams onto analog video carriers;

a digital network which transmits said synchronous data payload envelope from said multiplexing means to said demultiplexer; and said transmission link, where said transmission link transmits said analog video carriers from said modulation means to said customer's STT.

5. An interactive information services system as in claim 4, wherein said modulation means scrambles said data packet streams, encodes said scrambled data packet streams using an error correction algorithm, interleaves data packets of said encoded data packet streams, and maps said interleaved data packets into a payload area of a multi-rate transport (MRT) packet on an analog video carrier.

6. An interactive information services system as in claim 1, wherein said bi-directional communication path comprises:

said transmission link;

a digital communications link; and a connection management computer responsive to presentation control commands from said SP received over said digital communications link and responsive to presentation control commands from said STT received over said transmission link for establishing a bi-directional communication link between said SP and said STT during presentation of said requested program to said customer's information presentation device.

7. An interactive information services system as in claim 6, wherein said SP and said STT communicate via said bi-directional communication link without intervention of said connection management computer once said bi-directional communication link is established.

8. An interactive information services system as in claim 1, wherein said bi-directional communication path comprises:

a forward communication path from said SP to said customer's STT comprising a digital communications link to said SP, means for modulating a message received from said SP via said digital communications link onto an analog video carrier, and said transmission link to said customer's STT; and a reverse communication path from said customer's STT to said SP comprising said transmission link, means for demodulating a message received from said customer's STT via said transmission link, and said digital communications link to said SP.

9. An interactive information services system as in claim 8, further comprising a connection management computer in said forward and reverse communication paths for establishing and maintaining said forward and reverse communication paths between said SP and said customer's STT during presentation of said requested program to said customer's information presentation device.

10. An interactive information services system as in claim 8, wherein said transmission link has a predetermined frequency band, a first portion of said predetermined frequency band being allocated for providing said requested program to said customer's STT and for providing said forward communication path from said SP to said customer's STT, a second portion of said predetermined frequency band being allocated for providing said reverse communication path from said customer's STT to said SP, and a third portion of said predetermined frequency band being allocated between said first and second portions to provide a guard band therebetween to minimize cross-talk between said reverse communication path and said forward communication path and between said reverse communication path and said requested program.

11. An interactive information services system as in claim 1, wherein a plurality of customers having STTs concurrently access said bi-directional communication path between said STT and said SP in accordance with a time division multiple access (TDMA) technique in which each STT is assigned by a connection management computer (CMC) in said bi-directional communication path at least one time slot in a data stream from said STT to said SP for transmission of presentation control commands and data to said SP during presentation of said requested program.

12. An interactive information services system as in claim 11, wherein said STT and CMC communicate via message cells specifying a unique communications path and channel address between said STT and said CMC, whereby a message from said CMC occupying more than one message cell is given the same communications path and channel address in said more than one message cell.

13. An interactive information services system as in claim 11, wherein each STT receives a framed bit stream from said connection management computer over said bi-directional communication path, said framed bit stream including a frame counter value in each frame of said framed bit stream which is used by said STT to calculate said at least one time slot in said data stream from said STT to said SP for transmission of said presentation control commands and data to said SP during presentation of said requested program.

14. An interactive information services system as in claim 13, wherein an interval between respective time slots assigned to a particular STT is dynamically adjusted by said connection management computer in accordance with a volume of presentation control commands and data from other STTs over said bi-directional communication path.

15. An interactive information services system as in claim 11, wherein data contention among said STTs is resolved using a slotted ALOHA technique whereby each of said STTs is synchronized to a common clock and each STT can only begin a transmission of presentation control commands and data at a boundary between respective time slots.

16. An interactive information services system as in claim 15, wherein each STT assumes that data collision has occurred if that STT does not receive an echo signal within a predetermined amount of time after its transmission of said presentation control commands and data and then retransmits said presentation control commands and data during a randomly selected time slot occurring after said predetermined amount of time has elapsed.

17. An interactive information services system as in claim 15, wherein each STT assumes that data collision has occurred if that STT does not receive an echo signal within a predetermined amount of time after its transmission of said presentation control commands and data and then retransmits said presentation control commands and data on an alternate signalling frequency in said bi-directional communication path.

18. An interactive information services system as in claim 15, wherein each time slot assigned to said STTs includes a guard band which accounts for propagation time differences of said presentation control commands and data from said STTs via said transmission link.

19. A method of providing at least one of video, audio, and data programs requested by a customer from a data service provider (SP) and routing a requested program over a transmission link having a predetermined bandwidth to a set top terminal (STT) associated with an information presentation device of said customer, and for providing said customer with real-time interactive access to said requested program during presentation of said requested program to said STT by said SP, comprising the steps of:

establishing a unidirectional communication path from said SP to a plurality of STTs including said customer's STT for providing said requested program to said customer's STT for presentation of said requested program via said customer's information presentation device, said unidirectional communication path including said transmission link;

establishing a bi-directional communication path between said STT and said SP for communicating data and presentation control commands between said STT and said SP during presentation of said requested program to said customer's information presentation device, said bi-directional communication path also including said transmission link; and initiating and controlling presentation of said requested program on said information presentation device in a real-time manner in response to said presentation control commands communicated between said STT and said SP via said bi-directional communication path.

20. A method as in claim 19, comprising the further steps of digitizing said requested program, compressing the digitized program into asynchronous data packet streams, and then transmitting the compressed program over said unidirectional communication path to said customer's STT.

21. A method as in claim 20, wherein said transmitting step comprises the further steps of:

multiplexing said data packet streams into a synchronous data payload envelope of a predetermined format;

transmitting said synchronous data payload envelope to a demultiplexer;

demultiplexing said data packet streams from said synchronous data payload envelope;

modulating said data packet streams onto analog video carriers; and transmitting said analog video carriers to said customer's STT.

22. A method as in claim 21, wherein said modulating step comprises the steps of scrambling said data packet streams, encoding said scrambled data packet streams using an error correction algorithm, interleaving data packets of said encoded data packet streams, and mapping said interleaved data packets into a payload area of a multi-rate transport (MRT) packet on an analog video carrier.

23. A method as in claim 19, wherein said initiating and controlling step comprises the step of providing pass-through communication between said SP and said STT over said bi-directional communication path.

24. A method of establishing an information session connection between a customer's set top terminal (STT) and a data services provider (SP), comprising the steps of:

establishing a first bi-directional communications path between said SP and a connection management computer (CMC);

establishing a second bi-directional communications path between said STT and said CMC, said second bi-directional communications path including a information service connection between said STT and said CMC; and upon request by said STT, said CMC connecting said first and second bi-directional communications paths to each other to establish said information session connection between said SP and said STT, said information session connection permitting presentation control commands and data to flow from said SP to said STT and from said STT to said SP during presentation of a data service by said SP to said STT via an information service communications path, said presentation control commands initiating and controlling, on a real-time basis, presentation of said data service to an information presentation device connected to said STT.

25. A method of providing at least one of a video, audio, and information data service from a data service provider (SP) to a customer's set top terminal (STT), comprising the step of:

providing said data service from said SP to said STT via a first communications path;

said STT providing presentation control commands and data to said SP via a second communications path from said STT to said SP, said first and second communications paths including a common communications link connecting at least said STT to a headend, and said presentation control commands initiating and controlling presentation of said data service from said SP to said STT; and said SP varying, on a real-time basis, its presentation of said data service to said STT via said common communications link in response to said presentation control commands and data received from said STT via said common communications link.

26. A method as in claim 25, wherein said step of providing presentation control commands and data to said SP comprises the steps of assigning, in accordance with a time division multiple access (TDMA) technique, said STT at least one time slot in a data stream transmitted over said common communications link from said STT to said SP, and inserting said presentation control commands and data from said STT in said at least one time slot for transmission in said data stream over said common communications link from said STT to said SP.

27. A method as in claim 26, wherein said STT and SP communicate via message cells specifying a unique communications path and channel address between said STT and said SP, whereby a message from said SP occupying more than one message cell is given the same communications path and channel address in said more than one message cell.

28. A method as in claim 26, comprising the further steps of transmitting a framed bit stream from a connection management computer in said second communications path, said framed bit stream including a frame counter value in each frame of said framed bit stream, and said STT calculating said at least one time slot in said data stream in accordance with a received frame counter value from said connection management computer.

29. A method as in claim 28, wherein said step of providing presentation control commands and data to said SP comprises the step of dynamically adjusting an interval between respective time slots assigned to said STT by said connection management computer in accordance with a volume of presentation control commands and data from other STTs over said common communications link.

30. A method as in claim 26, wherein said step of providing presentation control commands and data to said SP comprises the step of resolving data contention among a plurality of STTs connected over said common communications link to said headend in accordance with a slotted ALOHA technique whereby each of said plurality of STTs is synchronized to a common clock and each of said plurality of STTs can only begin a transmission of presentation control commands and data at a boundary between respective time slots.

31. A method as in claim 30, wherein said step of providing presentation control commands and data to said SP comprises the steps of sending an echo signal from said STT when said presentation control commands and data are transmitted over said common communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said common communications link to said headend during a randomly selected time slot occurring after said predetermined amount of time has elapsed.

32. A method as in claim 30, wherein said step of providing presentation control commands and data to said SP comprises the steps of sending an echo signal from said STT when said presentation control commands and data are transmitted over said common communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said common communications link to said headend on an alternate signalling frequency.

33. A method as in claim 30, wherein said step of providing presentation control commands and data to said SP comprises the step of adding a guard band to each of said time slots which accounts for propagation time differences of said presentation control commands and data from said plurality of STTs along said common communications link.

34. A method of transmitting presentation control commands and data from a customer's set top terminal (STT) to a data service provider (SP) via a reverse communication path from said STT to said SP, said reverse communication path connecting at least said STT to a headend and including a communications link which also transmits a data service from said P to said STT, and said presentation control commands initiating and controlling presentation of said data service from said SP to said STT, comprising the steps of:

assigning each STT connected to said communications link at least one time slot in a data stream transmitted over said communications link from said STT to said SP;

inserting said presentation control commands and data from said STT in its assigned at least one time slot; and transmitting said data stream via said communications link from said STT to said SP.

35. A method as in claim 34, wherein said assigning step includes the steps of transmitting a framed bit stream in a forward communication path from said SP to said STT, said framed bit stream including a frame counter value in each frame of said framed bit stream, and said STT calculating said at least one time slot in said data stream in accordance with a frame counter value received over said forward communication path.

36. A method as in claim 34, comprising the further step of dynamically adjusting an interval between respective time slots assigned to said STT in accordance with a volume of presentation control commands and data from each other STT connected to said communications link.

37. A method as in claim 34, comprising the further step of resolving data contention among a plurality of STTs connected over said communications link to said headend in accordance with a slotted ALOHA technique whereby each of said plurality of STTs is synchronized to a common clock and each of said plurality of STTs can only begin a transmission of presentation control commands and data at a boundary between respective time slots.

38. A method as in claim 37, comprising the further steps of sending an echo signal from said STT when said presentation control commands and data are transmitted over said communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said communications link to said headend during a randomly selected time slot occurring after said predetermined amount of time has elapsed.

39. A method as in claim 37, comprising the further steps of sending an echo signal from said STT when said presentation control commands and data are transmitted over said communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said communications link to said headend on an alternate signalling frequency.

40. A method as in claim 37, comprising the further step of adding a guard band to each of said time slots which accounts for propagation time differences of said presentation control commands and data from said plurality of STTs along said communications link.

41. A system for transmitting presentation control commands and data from a customer's set top terminal (STT) to a data service provider (SP) via a reverse communication path from said STT to said SP, said reverse communication path connecting at least said STT to a headend and including a communications link which also transmits a data service from said SP to said STT, and said presentation control commands initiating and controlling presentation of said data service from said SP to said STT, said system comprising:

means for assigning each STT connected to said communications link at least one time slot in a data stream transmitted over said communications link from said STT to said SP;

means for inserting said presentation control commands and data from said STT in its assigned at least one time slot; and means for transmitting said data stream via said communications link from said STT to said SP.

42. A system as in claim 41, wherein said assigning means includes means for transmitting a framed bit stream in a forward communication path from said SP to said STT, said framed bit stream including a frame counter value in each frame of said framed bit stream, and said STT includes means for calculating said at least one time slot in said data stream in accordance with a frame counter value received over said forward communication path from said transmitting means.

43. A system as in claim 41, further comprising means for dynamically adjusting an interval between respective time slots assigned to said STT in accordance with a volume of presentation control commands and data from each other STT connected to said communications link.

44. A system as in claim 41, further comprising means for resolving data contention among a plurality of STTs connected over said communications link to said headend in accordance with a slotted ALOHA technique whereby each of said plurality of STTs is synchronized to a common clock and each of said plurality of STTs can only begin a transmission of presentation control commands and data at a boundary between respective time slots.

45. A system as in claim 44, further comprising means for sending an echo signal from said STT when said presentation control commands and data are transmitted over said communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said communications link to said headend during a randomly selected time slot occurring after said predetermined amount of time has elapsed.

46. A system as in claim 44, further comprising means for sending an echo signal from said STT when said presentation control commands and data are transmitted over said communications link to said headend, said STT listening for its echo signal for a predetermined amount of time after its transmission of said presentation control commands and data, and said STT retransmitting, when said echo signal is not received by said STT within said predetermined amount of time, said presentation control commands and data over said communications link to said headend on an alternate signalling frequency.

47. A system as in claim 44, further comprising means for adding a guard band to each of said time slots which accounts for propagation time differences of said presentation control commands and data from said plurality of STTs along said communications link.

48. A method of providing digital data comprising at least one of digital video, audio, and information data from a data service provider (SP) to a communications network for transmission to a customer's set top terminal (STT), comprising the steps of:

formatting said digital data from said SP into asynchronous data packet streams having a predetermined packet format;

multiplexing said data packet streams into a synchronous data payload envelope of a predetermined format;

interleaving error correction data with said data packet streams in said synchronous data payload envelope;

transmitting said synchronous data payload envelope to a headend over said communications network;

demultiplexing de-interleaving, and error correcting said data packet streams from said synchronous data payload envelope at said headend;

modulating, at said headend, said demultiplexed, de-interleaved and error corrected data packet streams onto analog video carriers corresponding to predetermined video channels of said STT; and transmitting said analog video carriers from said headend to said STT.

49. A method as in claim 48, wherein said modulating step comprises the steps of scrambling said data packet streams, encoding said scrambled data packet streams using an error correction algorithm, interleaving data packets of said encoded data packet streams, and mapping said interleaved data packets into a payload area of a multi-rate transport (MRT) packet on an analog video carrier.

50. A method as in claim 49, wherein said mapping step comprises the step of Quaternary Amplitude Modulating (QAM) said interleaved data packets onto said analog video carrier.

51. A method as in claim 48, comprising the further step of compressing said digital data from said SP prior to said formatting step.

52. A system for providing digital data comprising at least one of digital video, audio, and information data from a data service provider (SP) to a communications network for transmission to a customer's set top terminal (STT), comprising:

means under control of said SP for formatting said digital data from said SP into asynchronous data packet streams having a predetermined packet format;

means for multiplexing said data packet streams into a synchronous data payload envelope of a predetermined format;

means for interleaving error correction data with said data packet streams in said synchronous data payload envelope;

means for transmitting said synchronous data payload envelope to a headend over said communications network;

means for demultiplexing, de-interleaving, and error correcting said data packet streams from said synchronous data payload envelope;

means for modulating said demultiplexed, de-interleaved and error corrected data packet streams onto analog video carriers corresponding to predetermined video channels of said STT; and means for transmitting said analog video carriers from said headend to said STT.

53. A system as in claim 51, wherein said modulating means scrambles said data packet streams, encodes said scrambled data packet streams using an error correction algorithm, interleaves data packets of said encoded data packet streams, and maps said interleaved data packets into a payload area of a multi-rate transport (MRT) packet on an analog video carrier.

54. A system as in claim 53, wherein said modulating means comprises a Quaternary Amplitude Modulator (QAM) which modulates said interleaved data packets onto said analog video carrier.

55. A system as in claim 52, wherein said formatting means comprises means for compressing said digital data from said SP prior to formatting said digital data from said SP into said data packet streams.

56. A method of establishing a bi-directional connection between a data services provider (SP) and a customer's set top terminal (STT) for passage of presentation control commands and data between said SP and said STT during the presentation of a data service from said SP to said STT, said presentation control commands initiating and controlling presentation of said data service from said SP to said STT, said method comprising the steps of:

said STT sending to a connection management computer (CMC), via an information service connection connecting said STT to said connection management computer, a request for a connection to a particular data service provided by said SP;

said CMC sending, via a communications link with said SP, a request to said SP indicating that said STT has requested a connection to said particular data service;

if said SP indicates that said particular data service is available to said STT, said CMC allocating a portion of a bandwidth of said information service connection for transmission of said particular data service and assigning a program number to said particular data service and an input channel by which said SP is to connect over a digital network to said CMC;

said CMC notifying said SP of said program number and said input channel;

said SP connecting to said CMC over said digital network via said input channel and notifying said CMC that a connection between said CMC and SP has been made;

said CMC sending a message to said STT via said information service connection indicating that said particular data service is available;

said STT sending a request to said CMC requesting a connection to said connection between said CMC and said SP;

if said request by said STT for connection to said connection between said CMC and said SP is approved, said CMC allocating time slots during which said STT may communicate with said SP within said information service connection; and said CMC connecting said STT to said connection between said CMC and said SP so that said STT may send messages to said SP during presentation of said particular data service.

57. A method as in claim 56, comprising the further step of said STT sending presentation control commands and data to said SP along a pass-through communication path without intervention by said CMC.

58. A method as in claim 56, comprising the further step of tearing down said bi-directional connection between said SP and said STT, said tearing down step comprising the steps of:

said STT sending a request to said CMC that said connection to said particular data service be disconnected;

said CMC sending, via said communications link with said SP, a request to said SP indicating that said STT has requested that said connection to said particular data service be disconnected;

said SP sending to said STT, via said CMC, an acknowledgement of said request that said connection to said particular data service be disconnected;

said CMC sending disconnect commands to said STT and said SP; and said CMC deallocating said time slots within said information service connection upon receipt of acknowledgements by said SP and said STT that said disconnect commands have been received.

59. A method of establishing a bi-directional connection between a data services provider (SP) and a customer's set top terminal (STT) for passage of presentation control commands and data between said SP and said STT during the presentation of a continuous feed data service from said SP to said STT, said presentation control commands initiating and controlling presentation of said continuous feed data service from said SP to said STT, said method comprising the steps of:

said SP sending to a connection management computer (CMC), via a communications link connecting said SP to said connection management computer, a request to establish a continuous feed session for presentation of said continuous feed data service to customers;

upon receipt of said request, said CMC allocating a portion of a channel for presentation of said continuous feed session to said STT and said CMC assigning a program number to said continuous feed session;

said CMC sending a session provision command to said SP notifying said SP of said program number and of an input channel of said communications link over which said continuous feed session is to be provided to said CMC;

said SP connecting to said input channel of said communications link and sending a service available message to said CMC;

said STT sending a command to said CMC requesting connection to said continuous feed session existing between said SP and said CMC over said input channel of said communications link;

said CMC sending a message to said SP to determine whether said STT is permitted to connect to said continuous feed session;

if said STT is permitted to connect to said continuous feed session, said CMC allocating time slots during which said STT may communicate with said SP in a reverse communication path including a conductor between said STT and said CMC; and said CMC connecting said STT to said input channel between said CMC and said SP so that said STT may send messages to said SP in its allocated time slots of said reverse communication path during presentation of said continuous feed session to said STT by said SP.

60. A method as in claim 59, comprising the further step of said STT sending presentation control commands and data along said reverse communication path to said SP along a pass-through communication path without intervention by said CMC.

61. A method as in claim 59, comprising the further step of disconnecting said STT from said continuous feed data service from said SP, said disconnecting step comprising the steps of:

said SP sending a session disconnect command to said CMC;

upon receipt of said session disconnect command, said CMC sending a disconnect command to all STTs connected to said continuous feed session; and said CMC deallocating said time slots in said reverse communication path upon receipt of acknowledgements from said STTs that said disconnect command has been received.

62. A method of initiating and controlling presentation of a data service from a data services provider (SP) which provides at least one of a video, audio, and information data service to a customer's set top terminal (STT), comprising the steps of:

said STT requesting a data service from said SP by sending a data service request command to said SP from said STT;

said SP providing said requested data service to said STT;

said STT providing presentation control commands and data to said SP, said presentation control commands including a manipulating command for manipulating data provided by said requested data service; and said SP varying, on a real-time basis, its presentation of said requested data service to said STT in response to said presentation control commands received from said STT.

63. A system for initiating and controlling presentation of a data service from a data services provider (SP) which provides at least one of a video, audio, and information data service to a customer's set top terminal (STT), said STT comprising means for sending a data service request command to said SP and for providing presentation control commands and data to said SP during presentation of the requested data service, said presentation control commands including a manipulating command for manipulating data provided by the requested data service, and said SP comprising means for providing said requested data service to said STT and for varying, on a real-time basis, its presentation of said requested data service to said STT in response to said presentation control commands received from said STT.

64. A system as in claim 63, wherein said manipulating command comprises at least one of a fast-forward, rewind, pause, forward scan, reverse scan, play, and stop command.

* * * * *

UNITED STATES PATENT AND TRADEMARK OFFICE
CERTIFICATE OF CORRECTION

PATENT NO. : 5,481,542

DATED : January 2, 1996

INVENTOR(S) : Gary L. Logston, Anthony J. Wasilewski, Timothy H. Addington and William E. Wall, Jr.

It is certified that error appears in the above-indentified patent and that said Letters Patent is hereby corrected as shown below:

On the title page:
In the Abstract:

Line 6, "hi-directional" should be --bi-directional--.

Col. 12, line 24, change "($TDMA_{13}$ LEN)" to --(TDMA_LEN)--.

Col. 12, line 26, change "($TDMA_{13}$ DIST)" to --(TDMA_DIST)--.

Col. 12, line 27, change " $TDMA_{13}$ START " to -- TDMA_START --.

Col. 12, line 28, change " $TDMA_{13}$ START " to -- TDMA_START -

Col. 12, line 29, change " $TDMA_{13}$ START " to -- TDMA_START --

Col. 12, line 32, change "D $\neq$" to --D + 3--.

Col. 12, line 33, change "2D $\neq$" to --2D + 3--.

Col. 12, line 33, change "3D $\neq$" to --3D + 3--.

Col. 13, line 17, change "$TDMA_{13}$ START" to --TDMA_ START--.

Col. 13, line 18, change "$TDMA_{13}$CNT's" to --TDMA_CNT's--.

Col. 13, line 25, change "$TDMA_{13}$START" to --TDMA_START--.

Col. 13, line 26, change "$TDMA_{13}$DIST" to --TDMA_DIST--.

Col. 13, line 31, change "$TDMA_{13}$DIST" to --TDMA_DIST--.

Col. 20, line 42, change "$TERM_{13}$TYPE" to --TERM_TYPE--.

UNITED STATES PATENT AND TRADEMARK OFFICE
CERTIFICATE OF CORRECTION

PATENT NO. : 5,481,542
DATED : January 2, 1996
INVENTOR(S) : Gary L. Logston, Anthony J. Wasilewski,
  Timothy H. Addington and William E. Wall, Jr.

It is certified that error appears in the above-indentified patent and that said Letters Patent is hereby corrected as shown below:

Col. 20, line 44, change "$REV_{13}LEVEL$" to --REV_LEVEL--.

Col. 20, line 51, change "$HW_{13}ADDR$" to --HW_ADDR--.

Col. 20, line 53, change "$TRANS_{13} ID$" to --TRANS_ ID--.

Col. 20, line 55, change "$SERVER_{13}$" to --SERVER_--.

Col. 21, line 1, change "$PAGE_{13}SEL$" to --PAGE_SEL--.

Col. 21, line 32, change "$SP_{13}$" to --SP_--.

Col. 21, line 51, change "$SESSION_{13}ID$" to --SESSION_ID--.

Col. 21, line 61, change "$SION_{13}IDs$" to --SION_IDs--.

Col. 22, line 4, change "$TDMA_{13}CHNL$" to --TDMA_CHNL--.

Col. 22, line 5, change "$TDMA_{13}START, TDMA_{13}CNT,$ and $TDMA_{13}DIST$" to --TDMA_START, TDMA_CNT and TDMA_DIST--.

Col. 22, line 22, change "$SP_{13}DATA_{13}LEN$" to --SP_DATA_LEN--.

Col. 23, lines 18-19 change "$TDMA_{13}CHNL, TDMA_{13}START, TDMA_{13}CNT$ and $TDMA_{13}DIST$" to --TDMA_CHNL, TDMA_START, TDMA_CNT and TDMA_DIST--.

Col. 23, line 57, change "$TDMA_{13}CNT$" to --TDMA_CNT--.

Col. 24, line 6, change "$(PID_{13}CNT)$" to --(PID_CNT)--.

Col. 24, line 8, change "$(PID_{13}1-PID_n)$" to --(PID_1-PID_n)--.

UNITED STATES PATENT AND TRADEMARK OFFICE
CERTIFICATE OF CORRECTION

PATENT NO. : 5,481,542

DATED : January 2, 1996

INVENTOR(S) : Gary L. Logston, Anthony J. Wasilewski, Timothy H. Addington and William E. Wall, Jr.

It is certified that error appears in the above-indentified patent and that said Letters Patent is hereby corrected as shown below:

Col. 24, line 29, change "($INPUT_{13}CHNL$)" to --(INPUT_CHNL)--.

Col. 24, line 31, change "($PID_{13}CNT$)" to --(PID_CNT)--.

Col. 25, line 19, change "($MESSAGE_{13}LEN$)" to --(MESSAGE_LEN)--.

Col. 27, line 66, change "$SESSION_{13}ID$" to --SESSION_ID--.

Col. 13, line 25, change "$TDMA_{13} CNT$" to --TDMA_CNT--.

Signed and Sealed this

Twenty-second Day of October, 1996

Attest:

BRUCE LEHMAN

*Attesting Officer*　　　*Commissioner of Patents and Trademarks*